(12) United States Patent
Hassan et al.

(10) Patent No.: US 9,878,394 B2
(45) Date of Patent: Jan. 30, 2018

(54) POSITIONING SYSTEM AND METHOD FOR ARC WELDING CONSUMABLES

(71) Applicant: Victor Equipment Company, Denton, TX (US)

(72) Inventors: Khalid Hassan, Denton, TX (US); Glenn K. Redding, Flower Mound, TX (US)

(73) Assignee: Victor Equipment Company, Denton, TX (US)

( * ) Notice: Subject to any disclaimer, the term of this patent is extended or adjusted under 35 U.S.C. 154(b) by 353 days.

(21) Appl. No.: 14/540,089

(22) Filed: Nov. 13, 2014

(65) Prior Publication Data

US 2015/0136748 A1 May 21, 2015

Related U.S. Application Data

(60) Provisional application No. 61/903,950, filed on Nov. 13, 2013, provisional application No. 62/053,784, filed on Sep. 22, 2014.

(51) Int. Cl.

| *B23K 9/10* | (2006.01) |
| *B23K 9/16* | (2006.01) |
| *B23K 9/28* | (2006.01) |
| *B23K 9/12* | (2006.01) |
| *B23K 9/32* | (2006.01) |
| *B23K 9/29* | (2006.01) |

(Continued)

(52) U.S. Cl.
CPC .............. *B23K 9/295* (2013.01); *B21D 19/00* (2013.01); *B23K 9/173* (2013.01); *B23K 9/285* (2013.01); *B23K 9/32* (2013.01)

(58) Field of Classification Search
CPC ........ B21D 19/00; B21D 17/00; B21D 17/02; B23K 9/173; B23K 9/285; B23K 9/295; B23K 9/32; B23K 9/287
USPC ............ 219/137.31, 137.44, 137.52, 137.61, 219/137.62, 137.63, 137.42
See application file for complete search history.

(56) References Cited

U.S. PATENT DOCUMENTS

| 1,828,459 A | 10/1931 | Cornell et al. |
| 1,835,179 A | 12/1931 | Rue et al. |
| 2,432,639 A | 12/1947 | Webster et al. |

(Continued)

FOREIGN PATENT DOCUMENTS

| CN | 201902729 U | 7/2011 |
| DE | 231519 A1 | 1/1986 |

(Continued)

OTHER PUBLICATIONS

Non-Patent Literature for NewMetalWorker.com.*

(Continued)

*Primary Examiner* — Michael Hoang
(74) *Attorney, Agent, or Firm* — Edell, Shapiro & Finnan, LLC

(57) ABSTRACT

A nozzle assembly for a welding torch, a welding torch that includes said nozzle assembly, and a method of using the welding torch is provided. The nozzle assembly generally comprises an insulator having a plurality of grooves around an outer periphery, a plurality of sealing members disposed within the grooves of the insulator; and a nozzle body slip-fit around the insulator, such that at least one of the insulator and the nozzle body define position indicia.

22 Claims, 22 Drawing Sheets

(51) Int. Cl.
*B23K 9/173* (2006.01)
*B21D 19/00* (2006.01)

(56) References Cited

U.S. PATENT DOCUMENTS

| | | | |
|---|---|---|---|
| 2,438,292 | A | 3/1948 | Linker et al. |
| 3,018,360 | A | 1/1962 | Engel et al. |
| 3,629,547 | A | 12/1971 | Kester et al. |
| 4,105,891 | A | 8/1978 | Hill et al. |
| 4,158,763 | A * | 6/1979 | Moerke .............. B23K 9/295 |
| | | | 219/137.42 |
| 4,158,765 | A | 6/1979 | Moerke |
| 4,467,175 | A | 8/1984 | Reeh et al. |
| 4,554,432 | A | 11/1985 | Raloff |
| 5,669,556 | A | 9/1997 | Yoshida |
| 7,905,741 | B1 | 3/2011 | Wade et al. |
| 2004/0026394 | A1 | 2/2004 | Giese |
| 2005/0109738 | A1 | 5/2005 | Hewett et al. |
| 2007/0062922 | A1 | 3/2007 | Zamuner |
| 2007/0210049 | A1 | 9/2007 | Dingeldein |
| 2008/0035626 | A1 | 2/2008 | Christopher et al. |
| 2008/0188093 | A1 | 8/2008 | Jaeger |
| 2008/0290074 | A1 | 11/2008 | Speker et al. |
| 2009/0050609 | A1 | 2/2009 | Berger et al. |
| 2011/0000893 | A1 | 1/2011 | Blankenship et al. |
| 2013/0134143 | A1 | 5/2013 | Hassan et al. |
| 2014/0263253 | A1 | 9/2014 | Meess et al. |

FOREIGN PATENT DOCUMENTS

| | | |
|---|---|---|
| JP | S60-71482 U | 5/1985 |
| JP | S60-170574 A | 9/1985 |
| JP | H07256462 A | 10/1995 |
| JP | 2004276084 A | 10/2004 |
| JP | 2004-322127 A | 11/2004 |
| JP | 2009-142850 A | 7/2009 |
| KR | 2012-0000369 U | 1/2012 |
| KR | 2012-0081460 A | 7/2012 |
| WO | 2013157036 A1 | 10/2013 |

OTHER PUBLICATIONS

WayBackMachine date for NewMetalWorker.com.*
International Search Report and Written Opinion dated Feb. 29, 2016 for PCT/US2015/060377 filed Nov. 12, 2015.
International Search Report and Written Opinion dated Apr. 14, 2015 for International Application No. PCT/US2014/065577 filed Nov. 13, 2014.
International Search Report and Written Opinion dated Apr. 1, 2015 for International Application No. PCT/US2014065353 filed Nov. 13, 2014.
International Search Report and Written Opinion dated Apr. 1, 2015 for International Application No. PCT/US2014/065566 filed Nov. 13, 2015.
International Search Report and Written Opinion dated Mar. 18, 2015 for International Application No. PCT/US2015/065340 filed Nov. 13, 2014.
IInternational Search Report and Written Opinion dated Apr. 1, 2015 for International Application No. PCT/US2014/065351 filed Nov. 13, 2014.
International Search Report and Written Opinion dated Mar. 6, 2015 for International Application No. PCT/US2014/065504 filed Nov. 13, 2014.
International Search Report and Written Opinion dated Mar. 25, 2015 for International Application No. PCT/US2014/065346 filed Nov. 13, 2014.
International Search Report and Written Opinion dated Apr. 1, 2015 for International Application No. PCT/US2014/065487 filed Nov. 13, 2014.

* cited by examiner

The conduit liner is trimmed at the dotted line aligning with an index marking 906

1000

Providing an arc welding apparatus that includes a nozzle assembly defining position indicia constructed according to the teachings of the present disclosure

1005

Aligning the nozzle body in the nozzle assembly with the position indicia in order to adjust the positioning of the distal opening of the nozzle body with the distal end face of a contact tip

POSITIONING SYSTEM AND METHOD FOR ARC WELDING CONSUMABLES

CROSS-REFERENCE TO RELATED APPLICATIONS

This application claims the benefit of provisional application Ser. No. 61/903,950, filed on Nov. 13, 2013, and provisional application Ser. No. 62/053,784, filed on Sep. 22, 2014. The disclosures of the above applications are incorporated herein by reference in their entirety.

FIELD

The present disclosure relates generally to welding apparatuses, and more particularly to arc welding apparatuses such as Metal Inert Gas (MIG) or Gas Metal Arc Welding (GMAW) welding guns, including consumables for generating a welding arc and diffusing a shield gas.

BACKGROUND

The statements in this section merely provide background information related to the present disclosure and may not constitute prior art.

In an arc welding apparatus, such as Metal Inert Gas (MIG) or Gas Metal Arc Welding (GMAW) welding gun, a welding wire is fed through the welding gun to provide a molten metal pool to join metal work pieces together. An inert gas is directed through the front (distal) end of the welding gun to provide a surrounding layer or blanket of shielding gas to protect the molten metal pool from atmospheric contamination. The inert gas is typically a combination of various gases such as argon or helium, among others.

A prior art MIG or GMAW welding gun typically includes a contact tip and a gas diffuser connected to the contact tip. The contact tip has a central bore to guide the welding wire to the work pieces. The contact tip transfers electrical current to the welding wire. The contact tip is typically threaded into the gas diffuser and the gas diffuser defines gas passageways that direct the shielding gas around the contact tip. The contact tip and gas diffuser are constantly subjected to high heat and are susceptible to wear due to high temperature operation. A nozzle assembly surrounds the contact tip and gas diffuser. The nozzle assembly further directs the shielding gas towards the work pieces to blanket the molten metal pool.

SUMMARY

The present disclosure generally provides a nozzle assembly comprising an insulator having a plurality of grooves around an outer periphery, a plurality of sealing members disposed within the grooves of the insulator, and a nozzle body slip-fit around the insulator, such that at least one of the insulator and the nozzle body define position indicia. In one form, the insulator has a scale along its outer periphery as the position indicia. According to another form, the insulator defines a plurality of position rings disposed along its outer periphery as the scale. The plurality of position rings may comprise a light duty ring, a medium duty ring, and a heavy duty ring. The nozzle body may define at least one window or aperture through which a scale can be viewed as the position indicia.

The nozzle assembly may also be attached to a conductor tube that includes position indicia. The nozzle body may include a proximal end extension that allows alignment of the nozzle body with the position indicia on the conductor tube in order to adjust the nozzle body so that it is in a desired positional relationship with a contact tip.

The nozzle body may further comprise a distal end face and an exterior surface defining an index marking for measuring a trim distance for a welding liner. The distal end face abuts a portion of a conductor tube, and the welding liner extends distally from the portion of the conductor tube, for the measuring of the welding liner to extend into a contact tip. A length between a distal end face of the conductor tube and the index marking of the nozzle body defines the trim distance. The nozzle body may also include a tapered end portion, such that the trim distance is measured along the tapered end portion or perpendicular to the distal end face.

According to another aspect of the present disclosure, an arc welding apparatus is provided. The arc welding apparatus comprises a handle, a conductor tube attached to the handle, and a consumable assembly attached to the conductor tube. The consumable assembly comprises both a contact tip and the nozzle assembly as previously described above and further defined herein, wherein at least one of an insulator and a nozzle body define position indicia.

According to yet another aspect of the present disclosure a method of adjusting the positioning of a distal opening of a nozzle body with a distal end face of a contact tip in an arc welding apparatus is provided. The method generally comprises providing an arc welding apparatus as previously described above and further defined herein that defines position indicia and aligning a nozzle body with the position indicia in order to adjust the positioning of a distal opening of the nozzle body with the distal end face of a contact tip. The nozzle body is aligned with the position indicia by locating the position indicia so that it can be viewed through at least one window or aperture in the nozzle body.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 20:
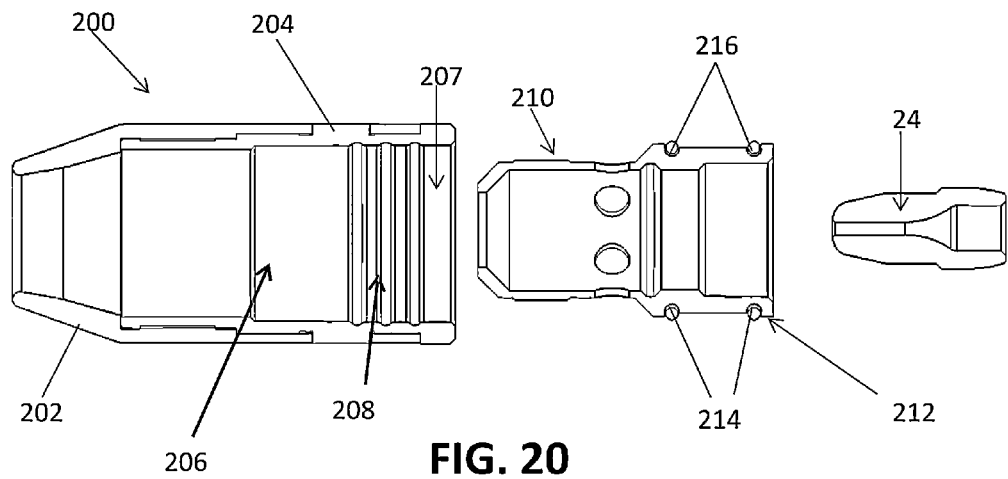
Figure 21:
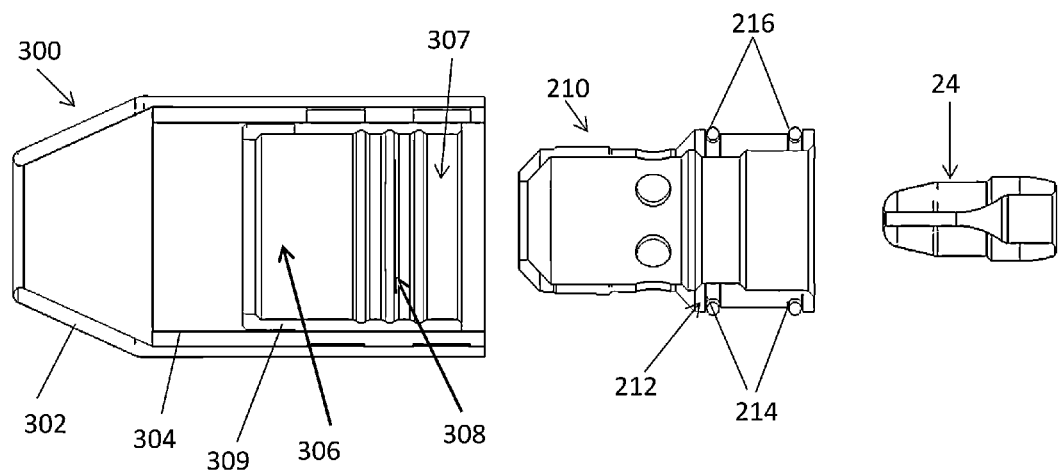
Figure 22:
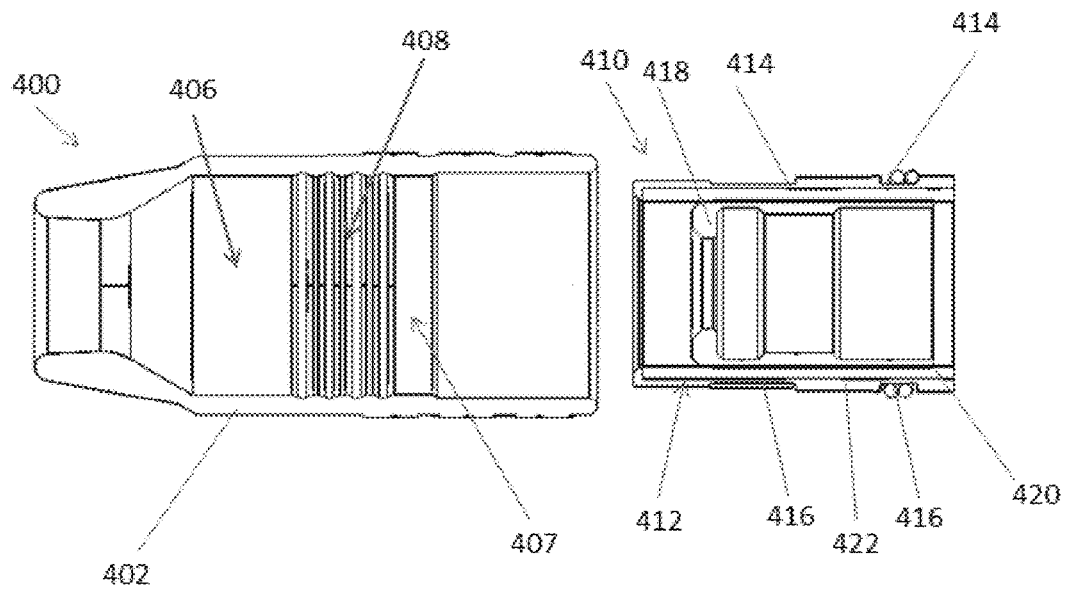
Figure 23:
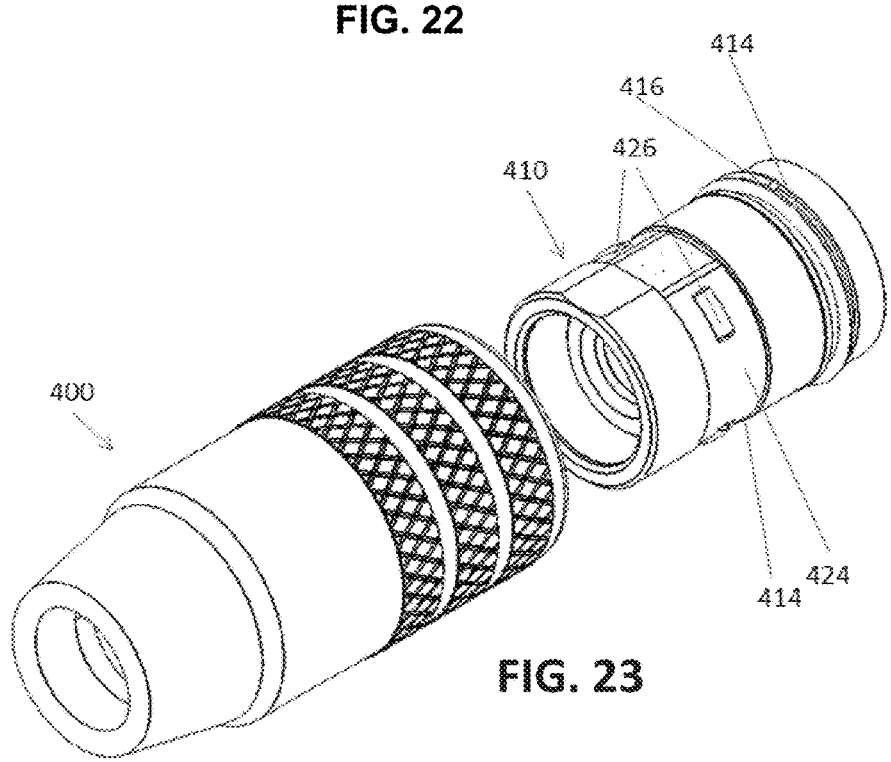
Figure 24:
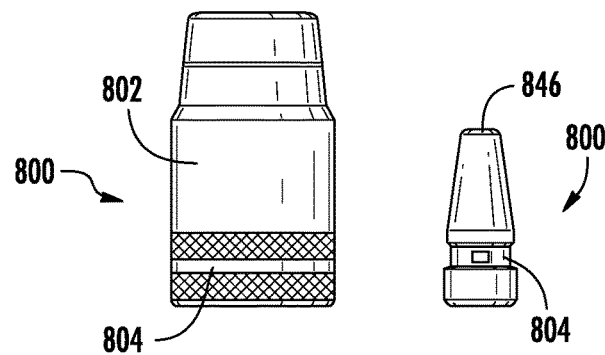
Figure 24:
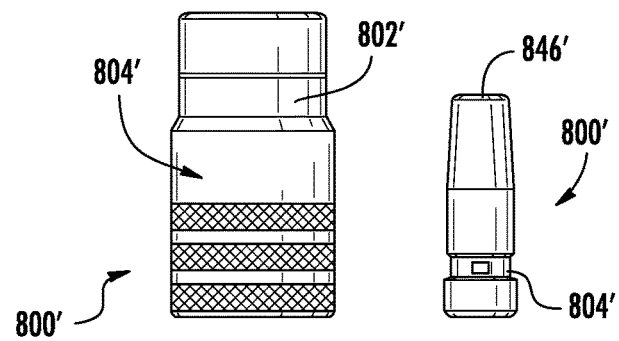
Figure 24:
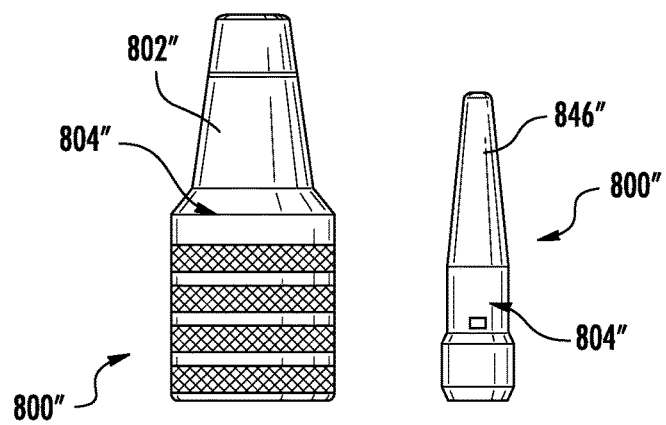

FIG. 20 an exploded cross-sectional view of a slip-on nozzle assembly constructed in accordance with the teachings of the present disclosure;

FIG. 21 an exploded cross-sectional view of another form of a slip-on nozzle assembly constructed in accordance with the teachings of the present disclosure;

FIG. 22 is an exploded cross-sectional view of still another form of a slip-on nozzle assembly constructed in accordance with the teachings of the present disclosure;

FIG. 23 is a perspective view of the slip-on nozzle assembly of FIG. 22;

FIG. 24 is a perspective view of several variations of nozzle assemblies and contact tips having matching indicia and constructed in accordance with the teachings of the present disclosure; and FIG. 25 is a schematic representation of a method of adjusting the positioning of a distal opening of a nozzle body with a distal end face of a contact tip in an arc welding apparatus in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. Although the term "MIG" and "GMAW" are used within the specification, it should be understood that the teachings of the present disclosure apply to any type of welding or cutting apparatus.

Figure 1:
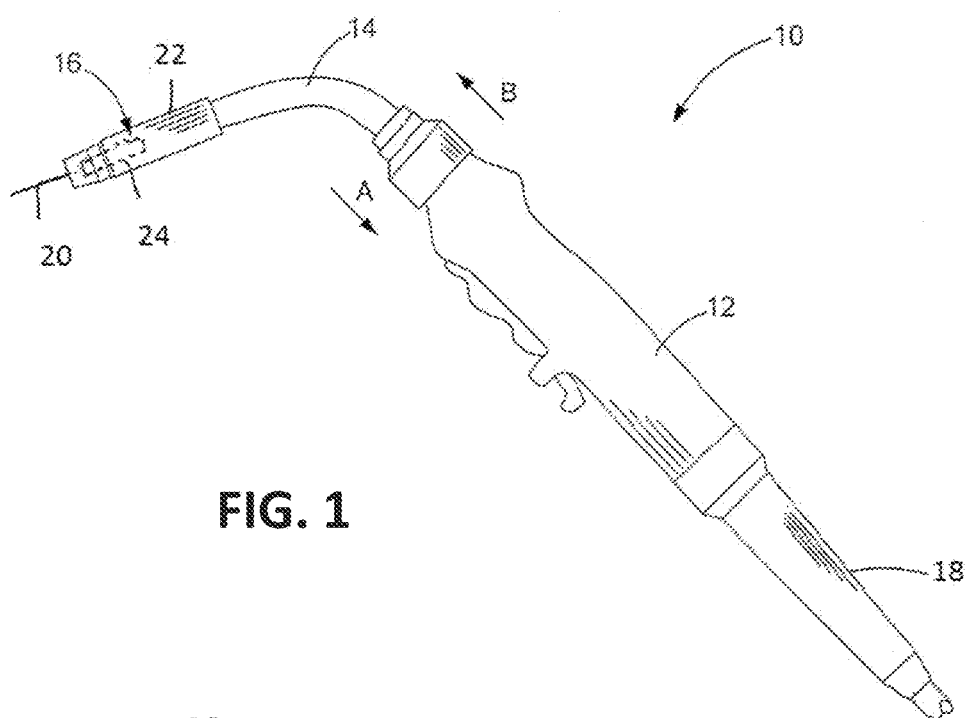
FIG. 1 is a side view of an arc welding apparatus.

Referring to FIG. 1, an arc welding apparatus, such as a MIG or GMAW welding gun, is illustrated and generally indicated by reference numeral 10. The MIG welding gun 10 includes a handle 12, a conductor tube 14 attached to the handle 12, and a consumable assembly 16 attached to the conductor tube 14. The handle 12 is connected to a welding cable 18 that carries welding current, shielding gas, and a welding wire 20 from a power source (not shown), a gas source (not shown), and a wire feeder (not shown) to the welding gun 10.

The consumable assembly 16 includes a plurality of consumable components including a nozzle assembly 22 and a contact tip 24. The structure and operation of an exemplary arc welding apparatus has been disclosed in U.S. Pat. Nos. 5,491,321 and 5,338,917, which are commonly owned by the assignee of the present application, and the contents of which are incorporated herein by reference in their entirety. In addition, the structure and operation of the arc welding apparatus 10 incorporating a contact tip that provides for the function as a contact tip and a diffuser has been disclosed in related U.S. Published Application No. 2013/0126506, which is commonly owned by the assignee of the present application, and the contents of which are incorporated herein by reference in their entirety.

Figure 2:
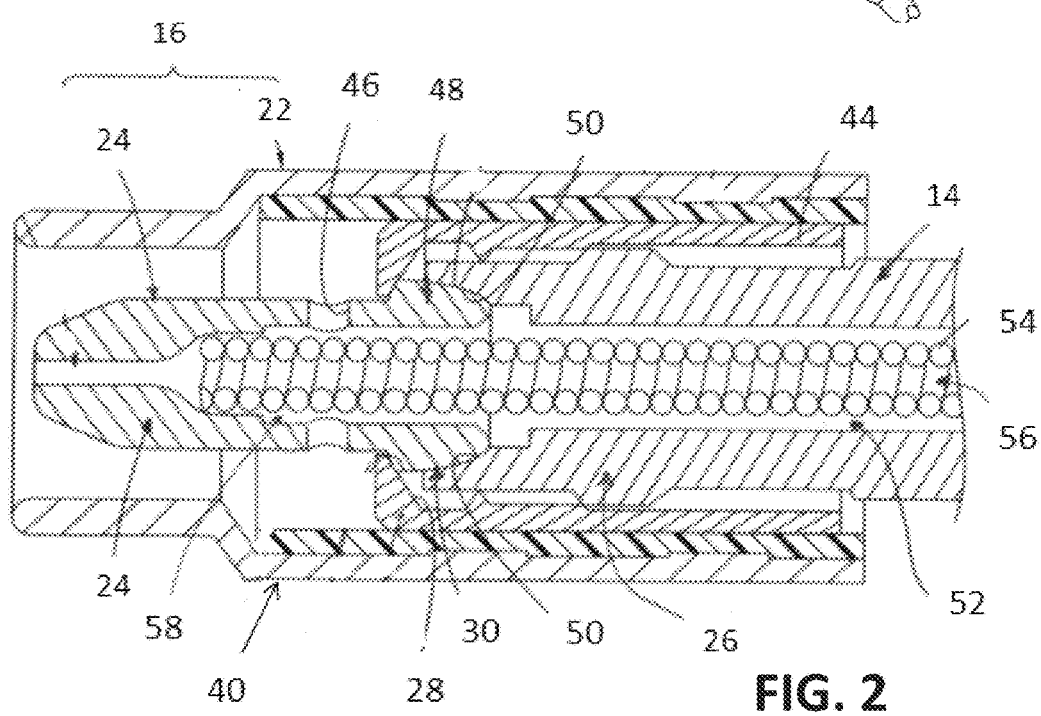
FIG. 2 is a cross-sectional view of a consumable assembly and a conductor tube assembly constructed in accordance with the teachings of the present disclosure.

Referring to FIG. 2, the consumable assembly 16 is connected to a distal end portion 26 of the conductor tube 14. A nozzle assembly 22 is substantially cylindrical in one form and receives the distal end portion 26 of the conductor tube 14 therein. In one form, a contact tip 46 is coaxially disposed inside the nozzle assembly 22, which has a seating surface 28 that is configured to mate with an end portion 30 (which in one form is spherical as shown, but could be any shape including a linear or polynomial taper) of the contact tip 24 into the distal end portion 26 of the conductor tube 14.

In one form the nozzle assembly 22 is secured onto the distal end 26 of the conductor tube assembly 40, and the contact tip 24 engages the seating surface 28 of a nozzle insert 44. As the nozzle assembly 22 is tightened onto the conductor tube assembly 40, the seating surface 28 engages against the shoulder 46 of the contact tip 24, thereby urging the spherical tapered end 48 of the contact tip 24 into the spherical tapered seat 50 of the conductor tube 14. The nozzle insert 44 tightens onto the conductor tube assembly 40 and the spherical tapered end 48 of the contact tip 24 is secured into engagement with the tapered seat 50.

The conductor tube 14 defines an internal passageway 52, and a conduit liner 54 is disposed within the internal passageway 52 as shown. The conduit liner 54 has a guiding channel 56 for guiding the welding wire 20 (not shown) to the contact tip 24. The conduit liner 54 may extend into an internal cavity 58 of the contact tip 24. The positioning of the conduit liner 54 within the internal cavity 58 provides a continuous guiding channel 56 for directly feeding the welding wire into the contact tip 24.

Figure 3A:
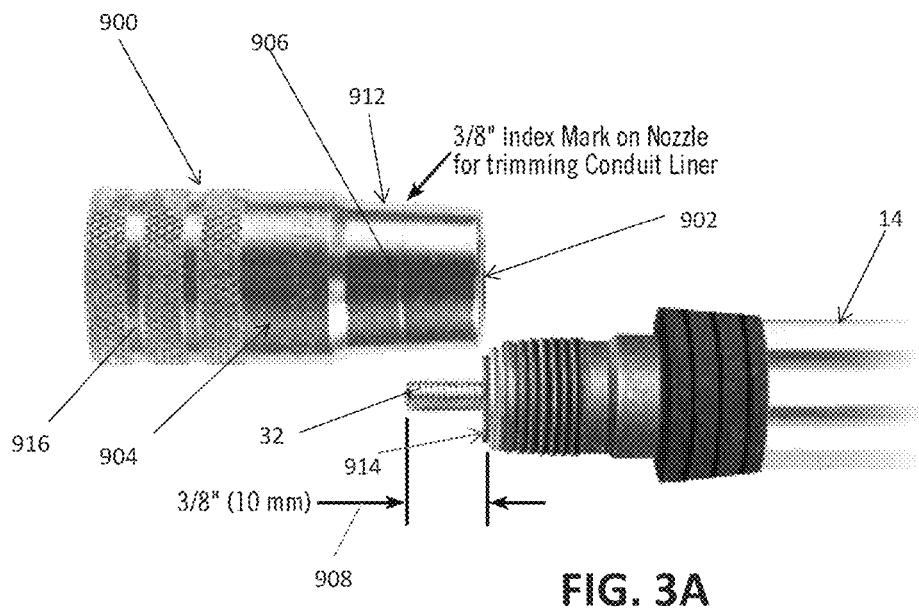
FIG. 3A is a side view of a conductor tube with a conduit liner and a nozzle assembly constructed in accordance with the teachings of the present disclosure.
Figure 3B:
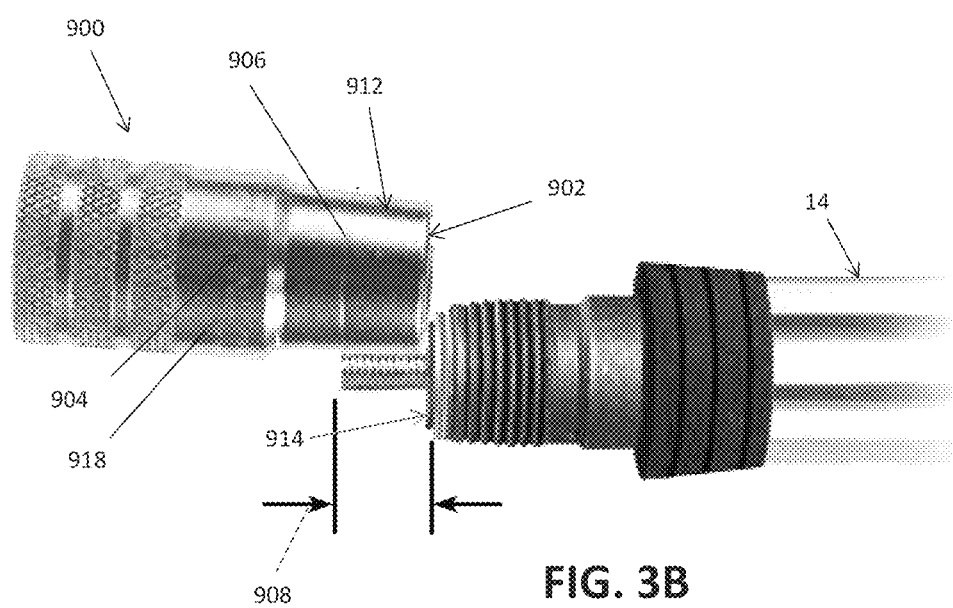
FIG. 3B is a side view of a conductor tube with a conduit liner and another form of a nozzle assembly constructed in accordance with the teachings of the present disclosure.

Referring to FIGS. 3A and 3B, an alternate form of a nozzle assembly 900 comprises a distal end face 902 and an exterior surface 904. The exterior surface 904 of the nozzle assembly 900 defines an index marking 906. The index marking 906 indicates a trim distance 908 to assist the user for properly measuring the conduit liner 32 to a correct length that extends from the conductor tube 14. The user can measure the trim distance 908 by abutting the distal end face 902 of the nozzle assembly 900 against an end portion 914 of the conductor tube 14.

The nozzle assembly 900 in one form may include a tapered end portion 912, and the index marking 906 may be positioned on this tapered end portion 912 of the nozzle assembly 900. The measurement of the trim distance 908 may be measured perpendicular to the distal end face of the of the nozzle body, as shown in FIG. 3A. Alternatively, it is contemplated the trim distance may be measured along the exterior surface 904 of the tapered end portion 912 of a nozzle body 918, as shown in FIG. 3B. The index marking 906 in one form is a groove extending around the exterior surface of the nozzle assembly 900. It should be understood, however, that various markings or indicia may be employed while remaining within the scope of the present disclosure. Such indicia may include, by way of example, knurling bands, intermittent circumferential markings, or color, among others.

Figure 3C:
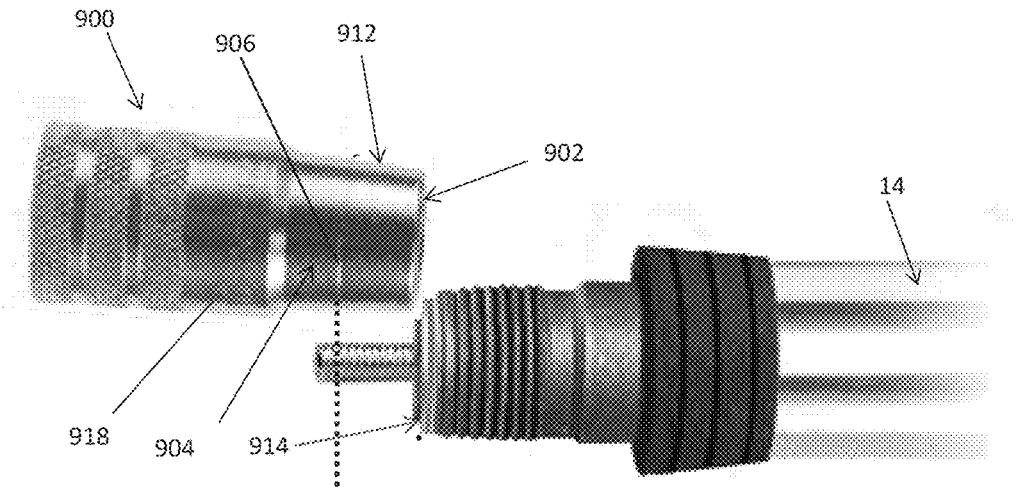
FIG. 3C is a side view of a conductor tube illustrating the alignment and a trim distance with an index marking in accordance with the teachings of the present disclosure.

Referring to FIG. 3C, in operation, when measuring the trim distance, the user abuts the distal end face 902 of the nozzle body 918 to the end portion 914 of the conductor tube 14 as shown. The user is then able to quickly line up and trim the conduit liner 32 with the index marking 906 for the correct trim distance 908, which then extends into the internal cavity 118 of the contact tip 46 (shown in FIG. 2).

Figure 3D:
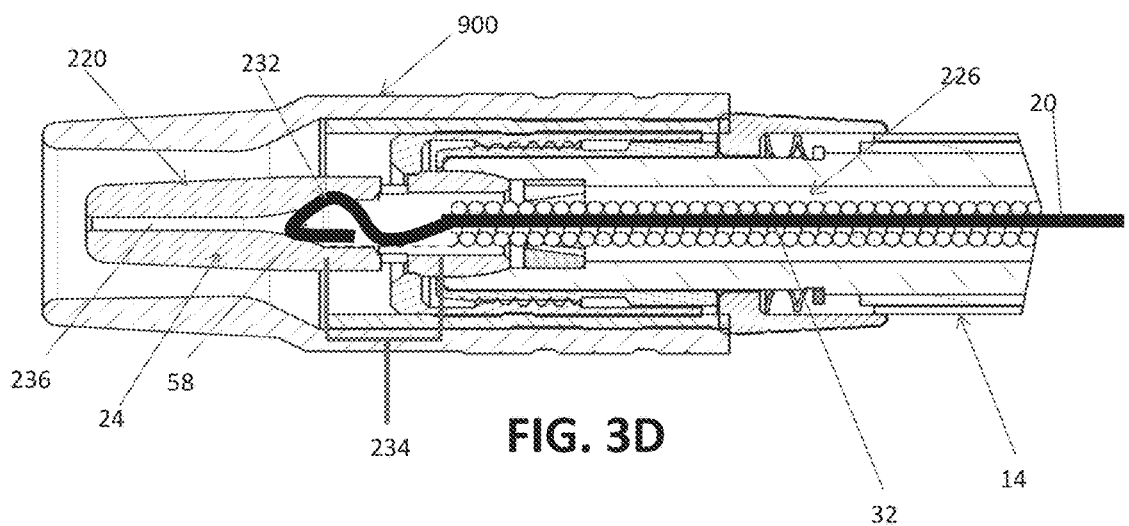
FIG. 3D is a cross-sectional view of a consumable assembly and a conductor tube depicting a improper trim distance and jam of a welding wire.

Proper positioning of the conduit liner 32 within the contact tip 24, or "stick-out" relative to the distal end portion 26 of the conductor tube 14, is a factor for the correct operation of the welding torch 10. The conduit liner 32 directs the welding wire 20 through the welding cable 18, torch 10, conductor tube 14 and into the contact tip 23. The correct trim distance 908 reduces the likelihood of jams, hang-ups or "birdnesting" of the welding wire 20 within the torch. For example, referring to FIG. 3D, if the trim distance is too short, a gap 234 between the conduit liner 32 and the contact tip 24 may be large enough that the welding wire 20 may be unsupported, causing the wire to sporadically wobble or become jammed 232 before entering an orifice 236 of the contact tip 24. In one form, the proper trim distance is ⅜ inches, which is based on a torch having an amperage rating between approximately 140 to 600 Amps and a specific geometry of the internal cavity 58 of the contact tip 24. It should be understood that ⅜ inches is merely exemplary and should not be construed as limiting the scope of the present disclosure.

Additional aspects of the location and features of the conduit liner 32 within the internal cavity 58 of the contact tip 24 has been disclosed in U.S. Published Application No. 2013/0126504 A1, which is commonly owned by the assignee of the present application, and the contents of which are incorporated herein by reference in their entirety.

Figure 4A:
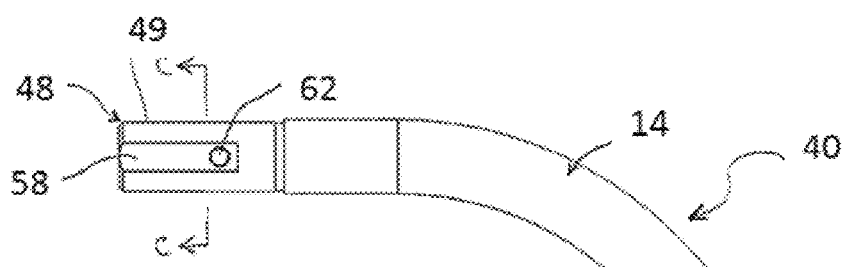
FIG. 4A is a side view of the conductor tube constructed in accordance with the teachings of the present disclosure.
Figure 4C:
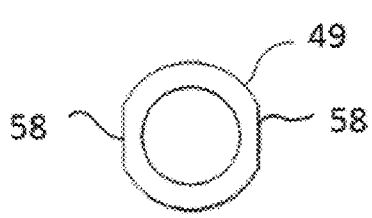
FIG. 4C is a cross-sectional view of the conductor tube of FIG. 3A taken along line C-C.
Figure 4B:
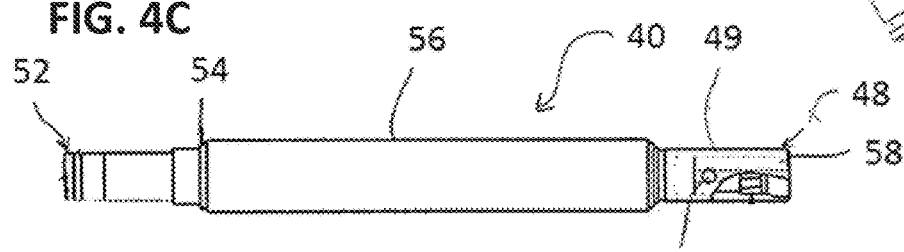
FIG. 4B is a side view of another form of the conductor tube constructed in accordance with the teachings of the present disclosure.

Referring to FIGS. 4A-4C, the conductor tube 14 can define a variety of geometries, and, a curved geometry of various degrees is used depending on the application requirements. The conductor tube 14 alternatively could be straight or flexible and configurable as has been disclosed in U.S. Published Application No. 2007/0284354, which is commonly owned by the assignee of the present application, and the contents of which are incorporated herein by reference in their entirety. The conductor tube assembly 40 extends a length between its distal end 41 and its proximal end 51. The proximal end 51 is adapted to be secured to the handle 12 of the welding gun 10, and the distal end 41 of the conductor tube 14 is adapted to receive the consumable assembly 16 (as shown in FIG. 1).

The distal end 41 of the conductor tube 14 provides unique features to allow for an efficient and robust connection with the consumable assembly 16, the nozzle assembly 22, and the contact tip 24. For example, in one form, the distal end 41 has an outer surface 49 that includes two opposing flat faces 59, that allows for an anti-rotational engagement with a sleeve (not shown). Additionally, in another form, the distal end 41 has a threaded opening 62 through at least one of the flat faces 59 for securing the sleeve.

The conductor tube 14 is typically made from a copper alloy or other metal that has conductive properties and then is coated with an insulation material 64, which in one form may be silicone, and finally covered with a tube jacket 66 to provide durability and additional insulation from the electric current, which flows through the conductor tube 14 during operation of the welding gun 10. The tube jacket 66 by way of example may be made from a brass or stainless steel metal or alloy in one form of the present disclosure.

Figure 5:
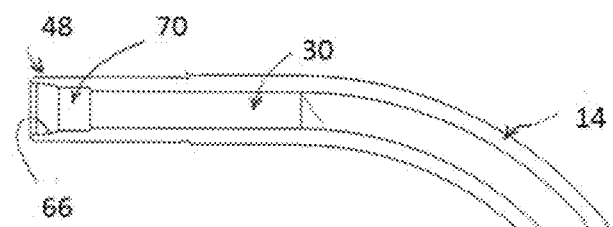
FIG. 5 is a cross-sectional view of another form of a conductor tube constructed in accordance with the teachings of the present disclosure.

As shown in FIG. 5, the conductor tube 14 is a hollow member defining the internal passageway 52. The internal passageway 52 includes a tailored cavity 70. The tailored cavity 70 is shaped to receive an alignment device (not shown in this figure), which in one form is press-fit therein. In addition, the internal passageway 52 at the distal end 72 includes a spherical tapered seat 50 forming a contact surface that engages with the contact tip 24.

Figure 6:
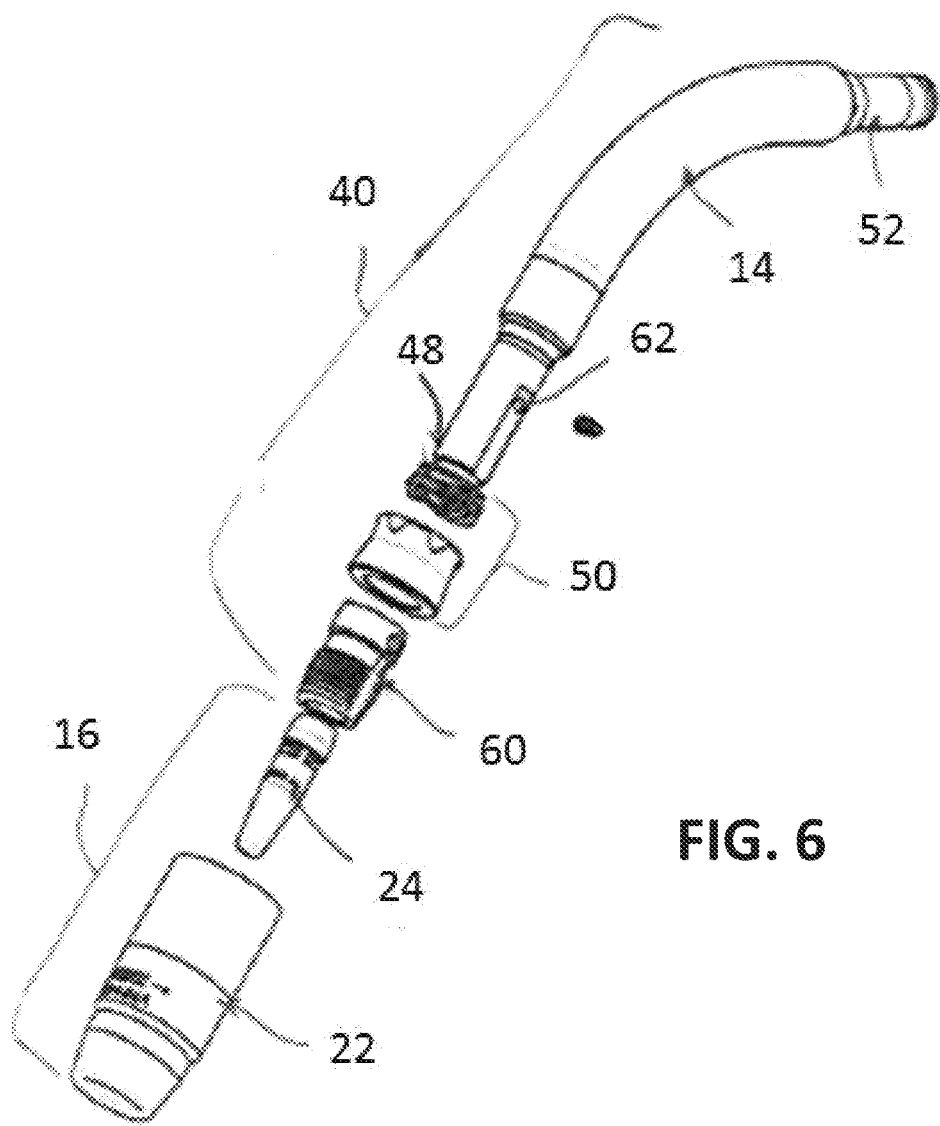
FIG. 6 is an exploded perspective view of a conductor tube assembly and a consumable assembly constructed in accordance with the teachings of the present disclosure.

FIG. 6 summarizes and illustrates components of the conductor tube assembly 40 and the consumable assembly 16. The consumable assembly 16 includes the nozzle assembly 22 and the contact tip 24. The consumable assembly 16 is secured to the distal end 41 of the conductor tube 14 via the sleeve 60, and the collar assembly 50 pretensions the consumable assembly 16 to the conductor tube assembly 40 as previously set forth.

The contact tip 24 has a body that defines an internal cavity extending from its proximal end portion to its distal end portion. Advantageously, the contact tip 24 is designed to function as both a contact tip for transferring electric current to the welding wire and a gas diffuser for diffusing shielding gas around the molten metal pool, thus providing a dual function while eliminating an additional component (i.e., a separate gas diffuser) from the consumable assembly 16.

Referring to FIGS. 7A-7C and 8-11, the nozzle assembly 22 includes a nozzle body 68 that is in one form generally cylindrical, an insulator 74, and a nozzle insert 44. As shown, the outer nozzle 68 extends from a proximal opening 78 to a distal opening 80. The nozzle body 68 may further include a nose portion 82 that narrows or extends inwardly to properly direct the shielding gas for a given application in relation to maintain the desired space 84 (FIG. 7A) for the contact tip 24. The nozzle insert 44 has a proximal end portion 86 and a distal end portion 88 and includes a central bore 90 extending from the proximal end portion 86 towards the distal end portion 88. The nozzle insert 44 at its distal end portion 88 defines an internal gas diverter 92. The internal gas diverter 92 further defines a seating surface 28 toward the proximal end portion of the nozzle insert 44. The seating surface 28 is chamfered in one form, for engaging the angled shoulder 46 of the contact tip 24. The internal gas diverter 92 defines a profiled diverter orifice 94 that extends distally from the central bore 90.

Figure 7A:
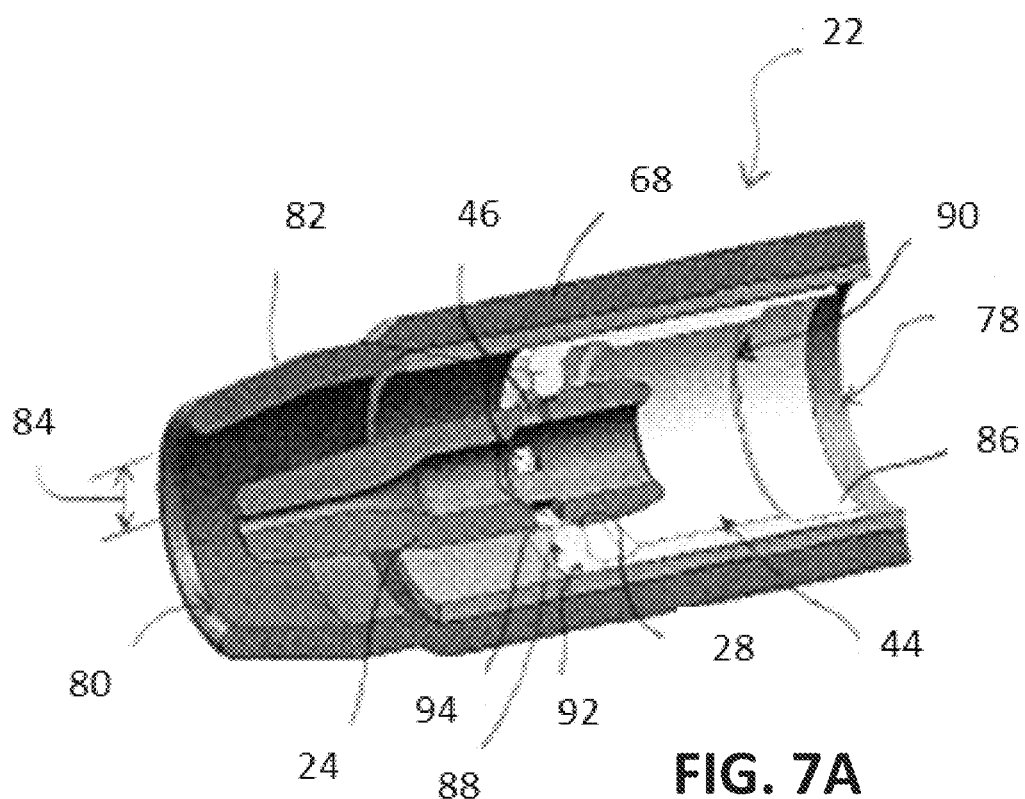
FIG. 7A is a perspective cross-sectional view of a consumable assembly constructed according to the teachings of the present disclosure.
Figure 7B:
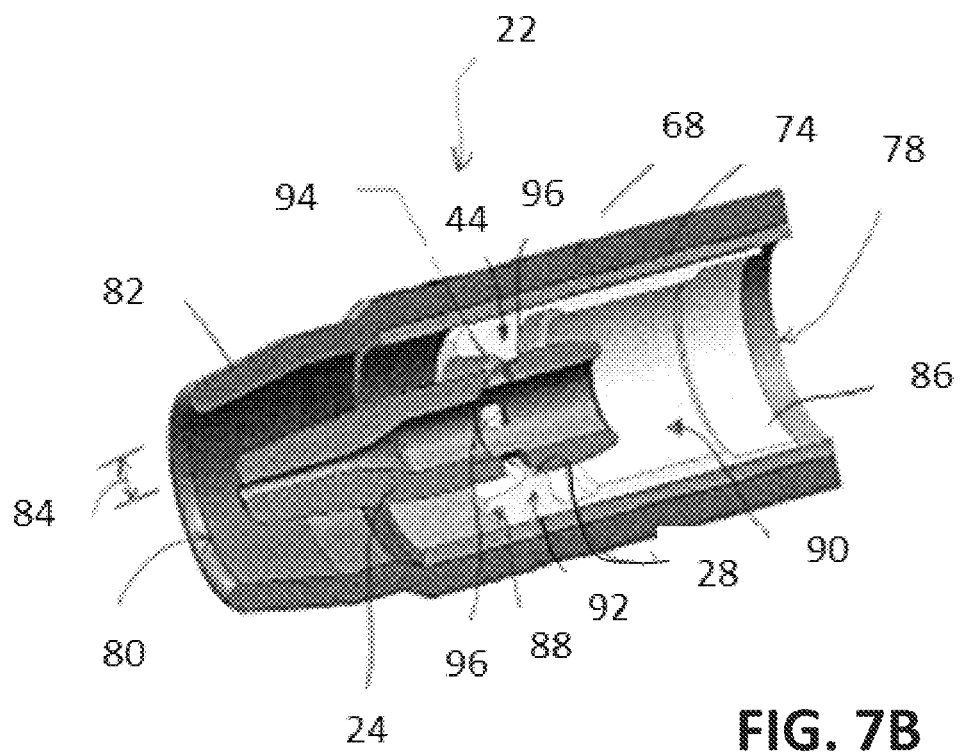
FIG. 7B is a perspective cross-sectional view of another form of a consumable assembly constructed in accordance with the teachings of the present disclosure.
Figure 7C:
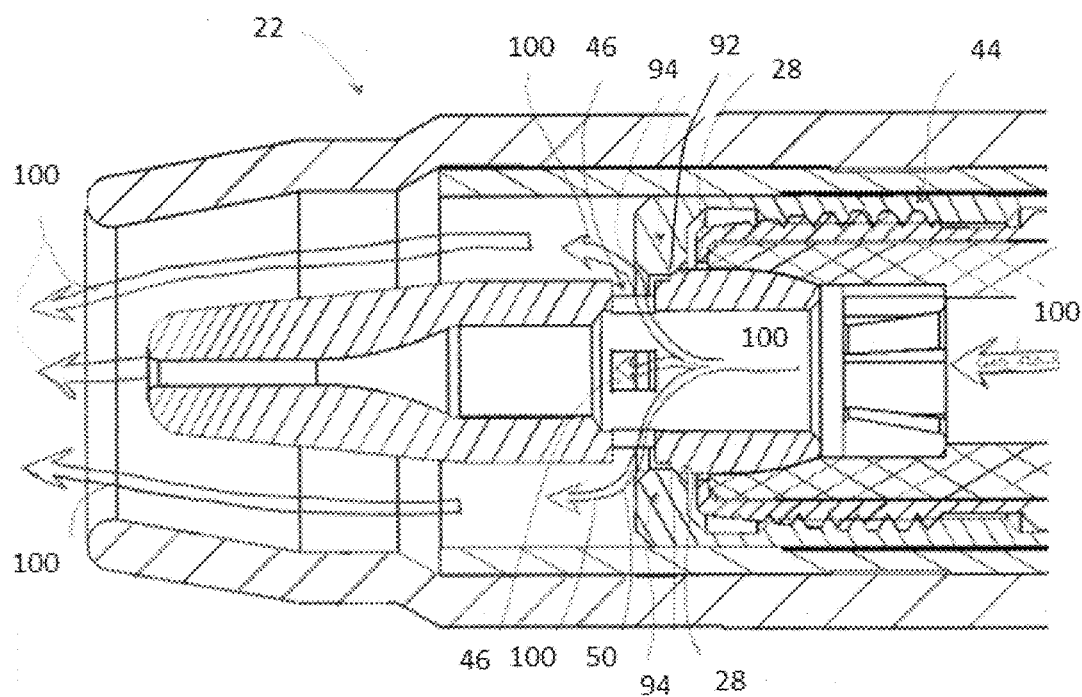
FIG. 7C is an enlarged side cross-sectional view of an nozzle insert and a tip of the consumable assembly of FIG. 6A.
Figure 8:
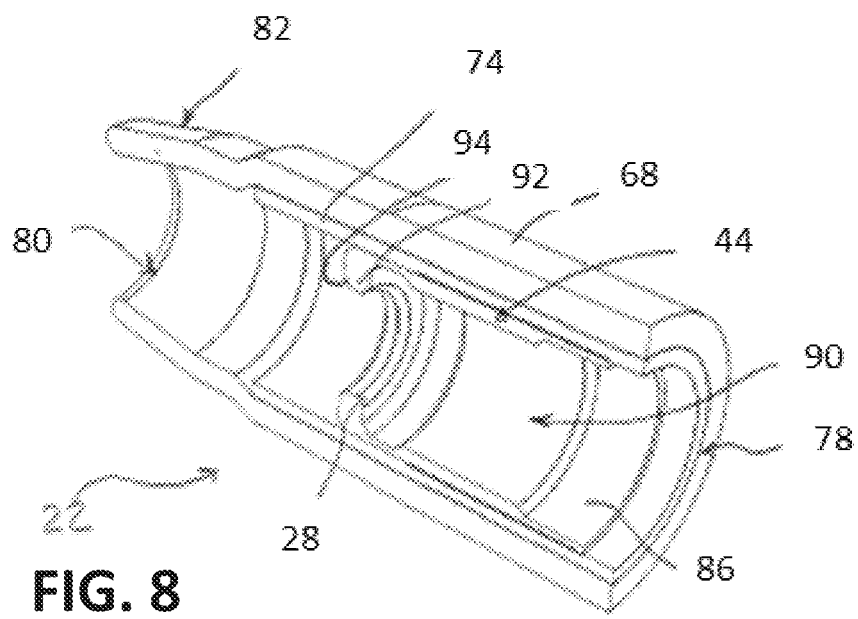
FIG. 8 is a perspective cross-sectional view of a nozzle assembly constructed in accordance with the teachings of the present disclosure.
Figure 9:
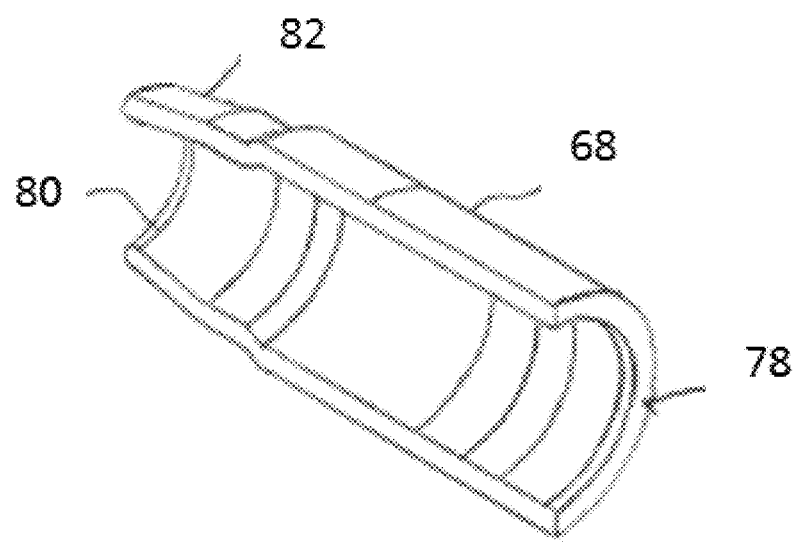
FIG. 9 is a perspective cross-sectional view of a nozzle body constructed in accordance with the teachings of the present disclosure.
Figure 10:
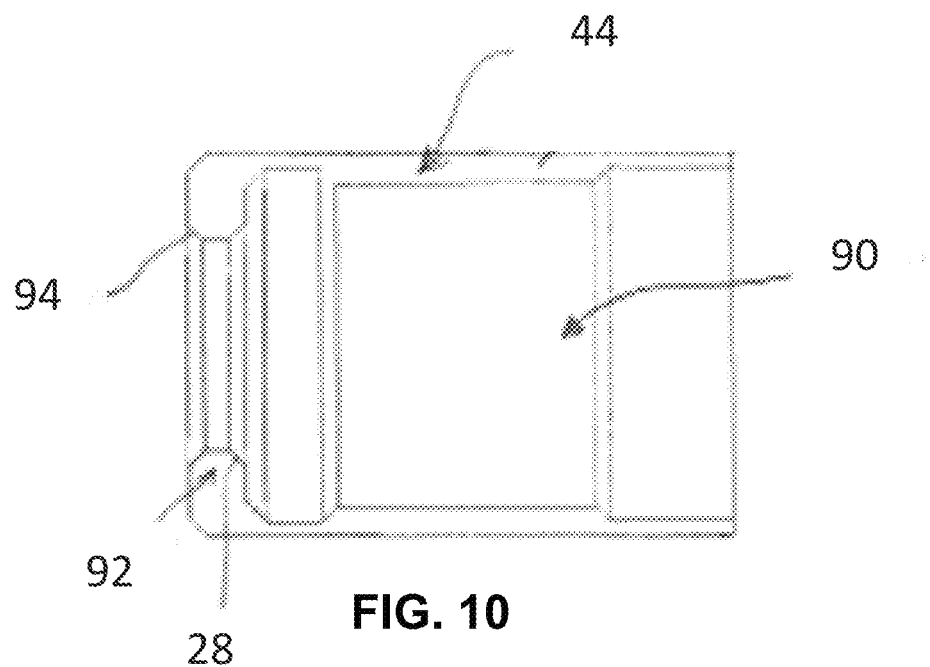
FIG. 10 is a side cross-sectional view of a nozzle insert of a nozzle assembly constructed in accordance with the teachings of the present disclosure.
Figure 11:
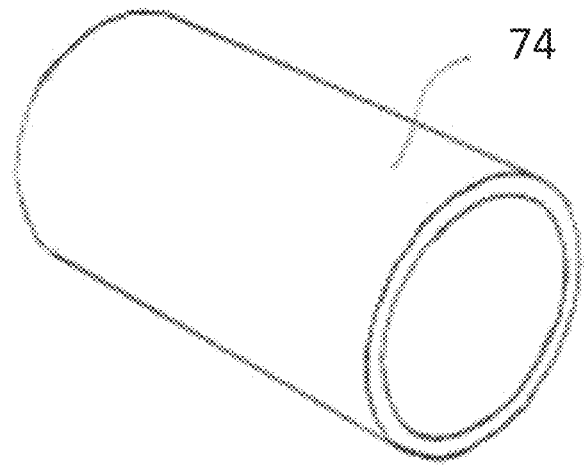
FIG. 11 is a perspective of an insulator of a nozzle assembly constructed in accordance with the teachings of the present disclosure.

As shown in FIG. 7C, the profiled diverter orifice 94 extends around the apertures 96 of the contact tip 24. The gas flow, indicated by the path arrows 167, is directed distally through the internal cavity 58, and then radially outwards through the apertures 96. The profiled diverter orifice 94 then directs the gas flow exiting the apertures 96 distally around an exterior portion of the contact tip 24 as shown. The profiled diverter orifice 94 may extend various lengths from the contact seat 28 (as shown in FIGS. 7A and 7B) and include a variety of geometries, in addition to the chamfered configurations as illustrated herein. In addition, the profiled diverter orifice 94 may extend at any angle that will change the direction of the shield gas to improve the flow characteristics or cooling of the contact tip 24 and surrounding nozzle assembly 22. For example, to generate a laminar flow along the length of the contact tip 24.

The nozzle insert 44 may be manufactured by various methods including machining or a metal injection molding process, also known as MIM. In addition, the nozzle insert may be made from various metals and alloys, for example, in one form the nozzle insert 44 is made of brass.

According to one aspect of the present disclosure, a nozzle assembly is provided that comprises an insulator having a plurality of grooves around an outer periphery. The insulator has a plurality of sealing members disposed within the grooves of the insulator, and a nozzle body slip-fit around the insulator.

Figure 12:
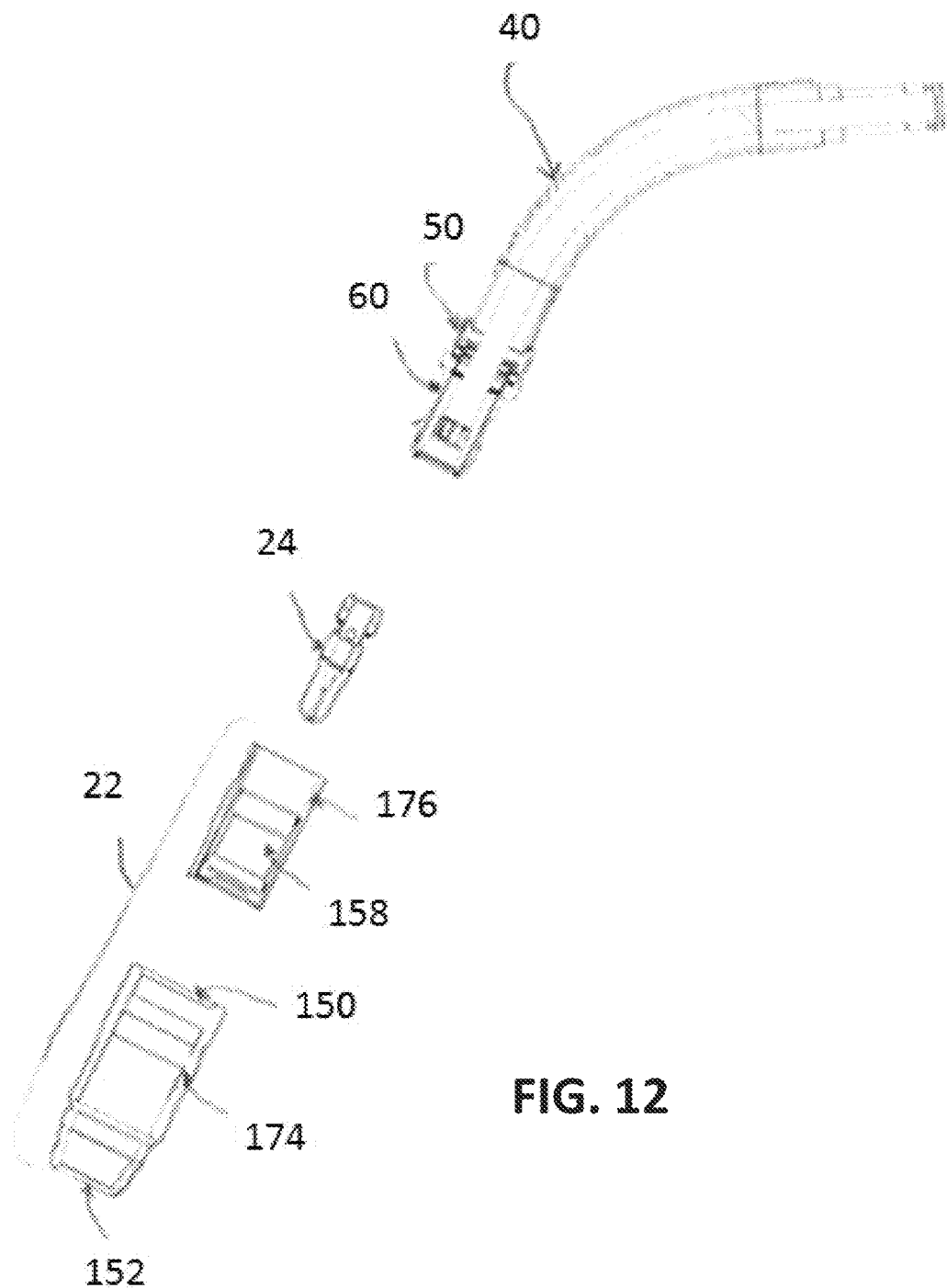
FIG. 12 is an exploded side view of another form of a nozzle assembly, a contact tip, and a conductor tube assembly constructed in accordance with the teachings of the present disclosure.
Figure 13A:
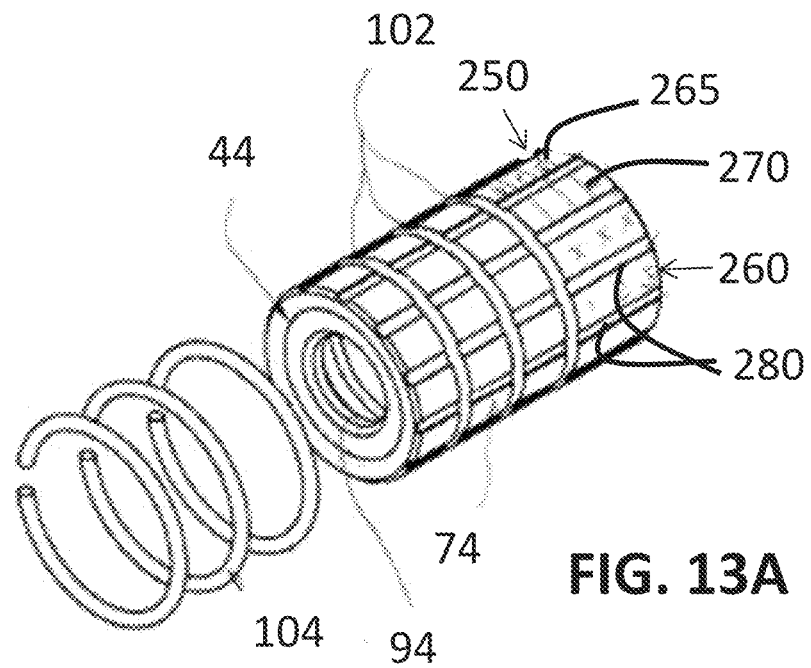
FIG. 13A is a perspective view of another form of an insulator body constructed in accordance with the teachings of the present disclosure.
Figure 13B:
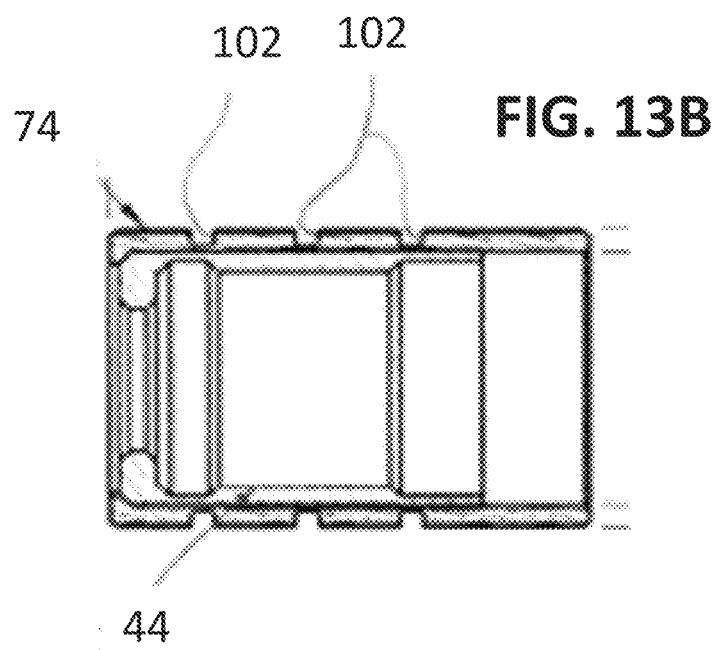
FIG. 13B is a cross-sectional view of another form of an insulator body and nozzle insert constructed in accordance with the teachings of the present disclosure.

Referring now to FIGS. 12, 13A and 13B, in another form, the nozzle assembly includes a nozzle body 68 that is slip-fit around an insulator 74. As shown in FIG. 12, the insulator 74 and a nozzle insert 44 define an assembly and are secured to the sleeve 60 on the conductor tube assembly 40. In one form, the insulator 74 is secured around the nozzle insert 44. As further shown in FIGS. 13A and 13B, the insulator 74 includes a plurality of grooves 102 around its outer periphery. The grooves 102 are used for locating and seating sealing members 104, which provide a sealing engagement between the nozzle body 68 and the insulator 74. In one form, the sealing members 104 are spring rings that are located within the grooves 102. Although the insulator 74 is illustrated with three (3) grooves 102, it should be understood that a greater or fewer number may be used depending on the application and the length of the nozzle body 68, among other operating parameters.

The insulator 74 may further include various features on its exterior surface to allow for positioning the insulator 74 without the use of any tools. The insulator 74 may further include a tail portion 250 having position indicia 260, such as scale lines 265 along the outer periphery, as shown by way of example, for properly positioning the nozzle body 68 over the insulator 74. In one form, the indicia 260 is a plurality of position rings 270 disposed around the outer periphery of the insulator 74 as shown. The position rings 270 or indicia 260 may be used to provide information to the user regarding the proper positioning of the nozzle body for the welding application, rated duty cycle and/or application of the nozzle assembly 22. The position rings 270 or indicia 260 may assist a user in determining a nozzle distance 275, as will be discussed below in further detail.

The insulator may also include exterior features that assist with gripping the insulator 74 for tightening and removing the insulator from the conductor tube assembly 40. In one example the exterior features may include a series of grooves 280 extend along the exterior surface, but if would be appreciated that various surface texturing may provide an improved gripping surface.

Figure 14A:
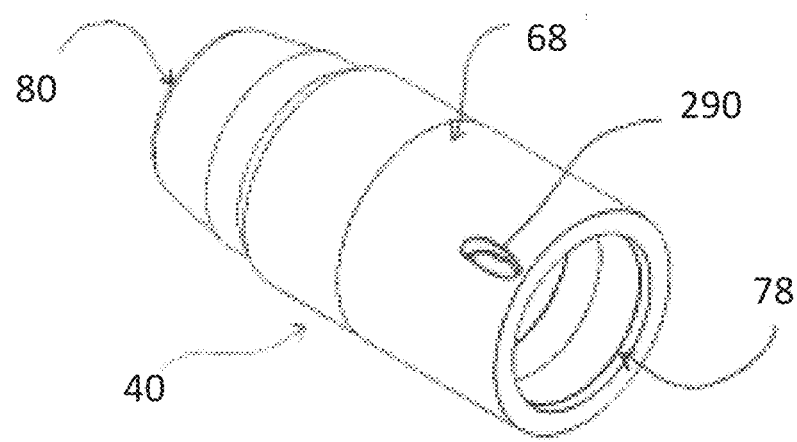
FIG. 14A is a perspective view of the nozzle assembly of FIG. 12 further including a window and constructed in accordance with the teachings of the present disclosure.
Figure 14B:
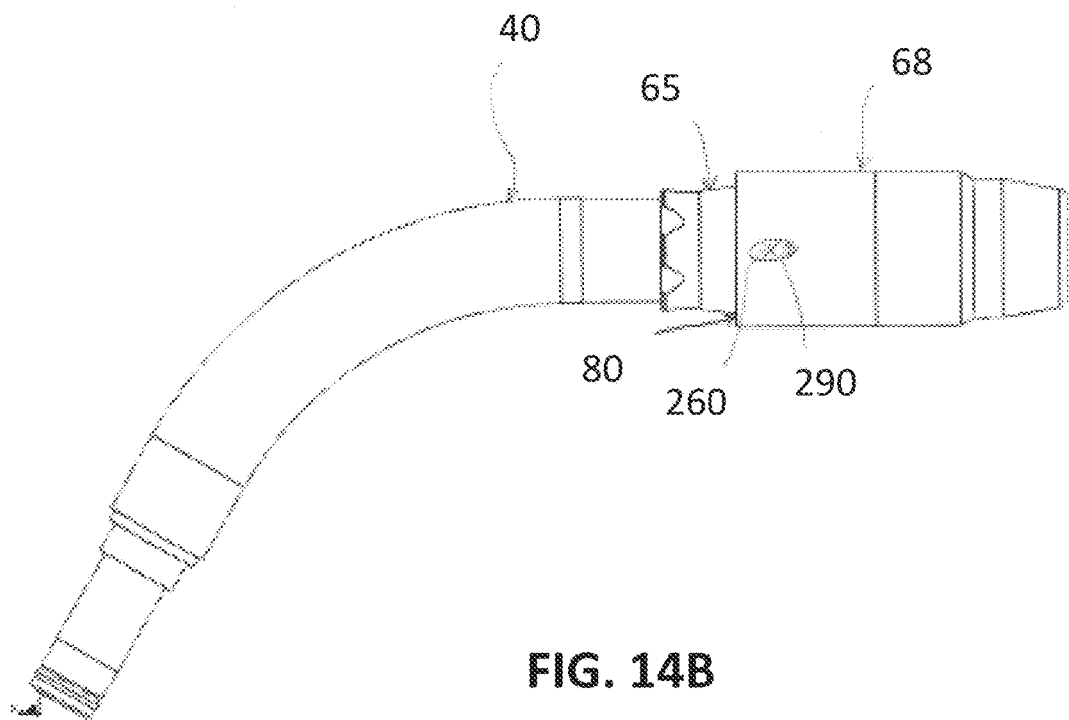
FIG. 14B is a side view of the nozzle assembly of FIG. 14A and the insulator body of FIG. 13A.

Referring to FIGS. 14A and 14B, the indicia 260, in another form, allows the user to align the nozzle body 68 with the position indicia 260 for adjusting and positioning the distal opening 80 of the nozzle body 68 relative the distal end face of the contact tip 24. The nozzle body 68 includes a window 290 for viewing the indicia 260 to locate the proper position of the nozzle body 68. In other forms, the window 290 may be any aperture through the nozzle body 68, and there may be one or numerous windows spaced around the nozzle body 68.

Figure 15:
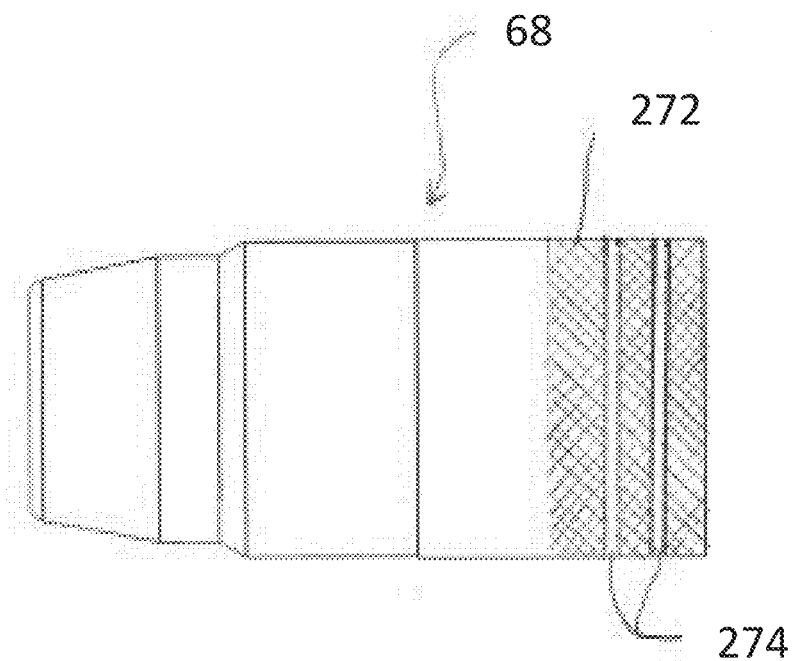
FIG. 15 is a side view of one form of a nozzle body constructed to indicate specific operating parameters in accordance with the teachings of the present disclosure.
Figure 16:
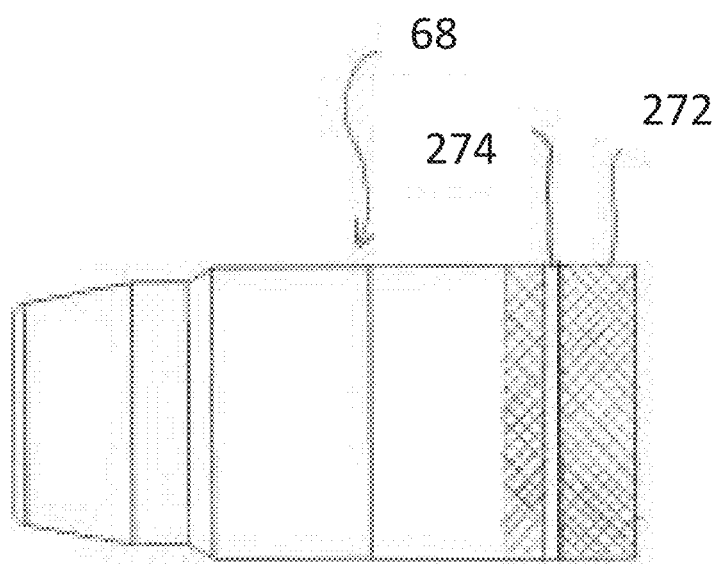
FIG. 16 is a side view of another form of a nozzle body constructed to indicate other operating parameters and constructed in accordance with the teachings of the present disclosure.
Figure 17:
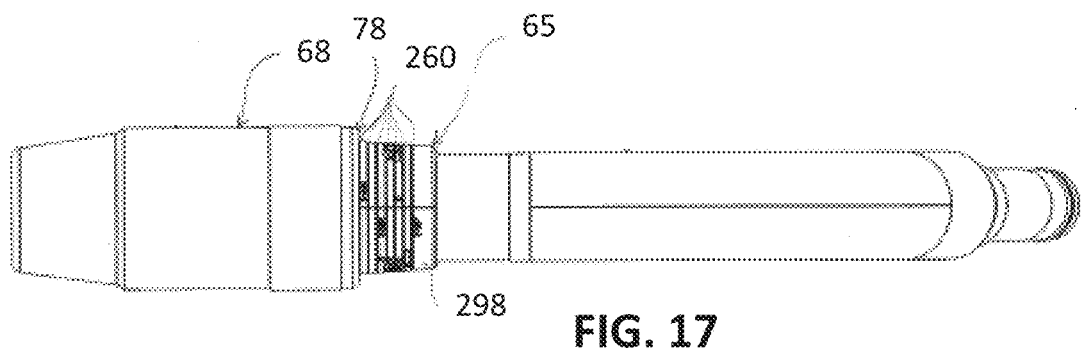
FIG. 17 is a top view of one form of a nozzle body, collar assembly and conductor tube assembly in accordance with the teachings of the present disclosure.

Referring back to FIGS. 15 and 16, the nozzle body 68 may further include an external surface pattern 272 to provide an improved grip for securing, positioning and removing the nozzle assembly 22. In one form, the nozzle body 68 the surface pattern 272 is formed by knurling. The nozzle body 68 may also include exterior surface markings to indicate the rated duty cycle or application of the nozzle assembly 22. In one example, the exterior markings define a ring 274 around the nozzle body 68, where no ring is used to indicate a light duty application, one ring is used to indicate a medium duty application and two rings are used to indicate a heavy duty application. However, it should be appreciated that any indicia and/or surface patterns may be used to indicate the rated duty cycle and/or application of the nozzle assembly 22. However, it should be appreciated that any indicia and/or surface patterns may be used to indicate the rated duty cycle and/or application of the nozzle assembly 22.

Figure 18A:
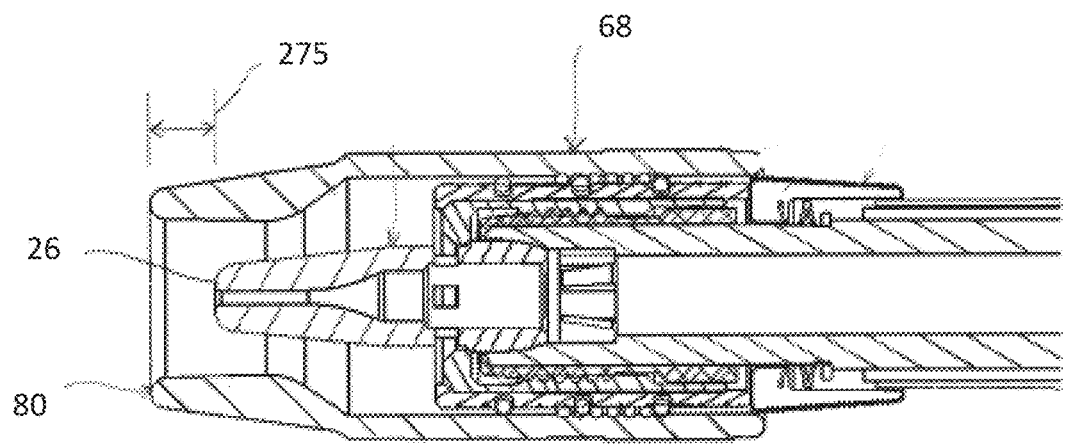
FIG. 18A is a partial cross-sectional view of the nozzle body of FIG. 17 in an initial position.
Figure 18B:
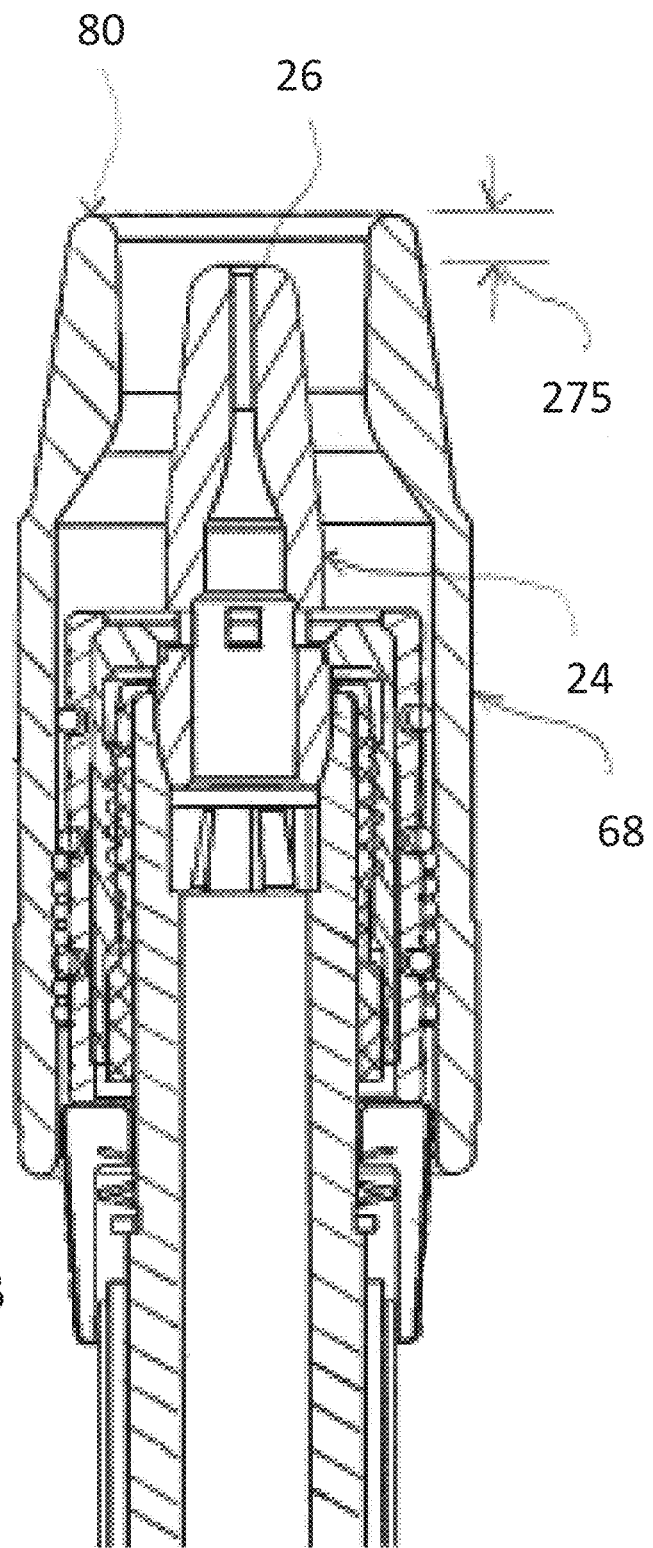
FIG. 18B is a partial cross-sectional view of the nozzle body of FIG. 17 in a first position.
Figure 18C:
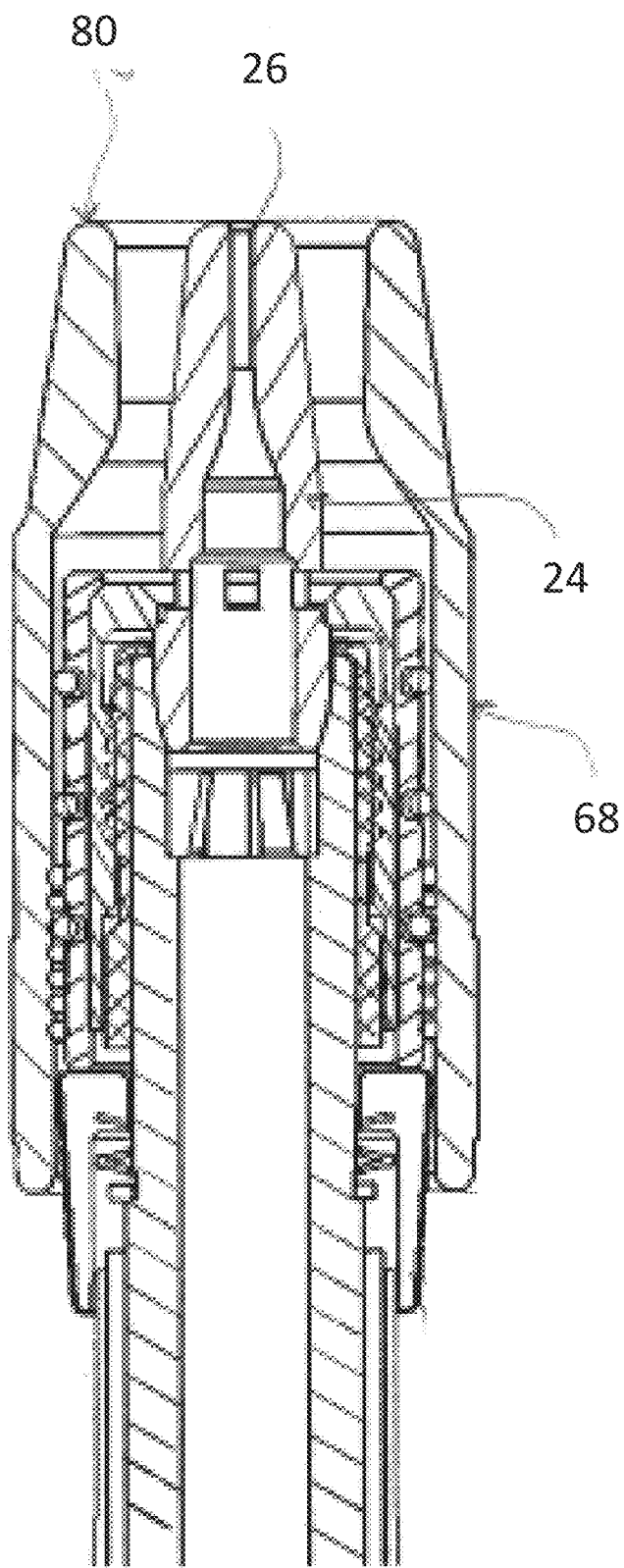
FIG. 18C is a partial cross-sectional view of the nozzle body of FIG. 17 in a second position.
Figure 18D:
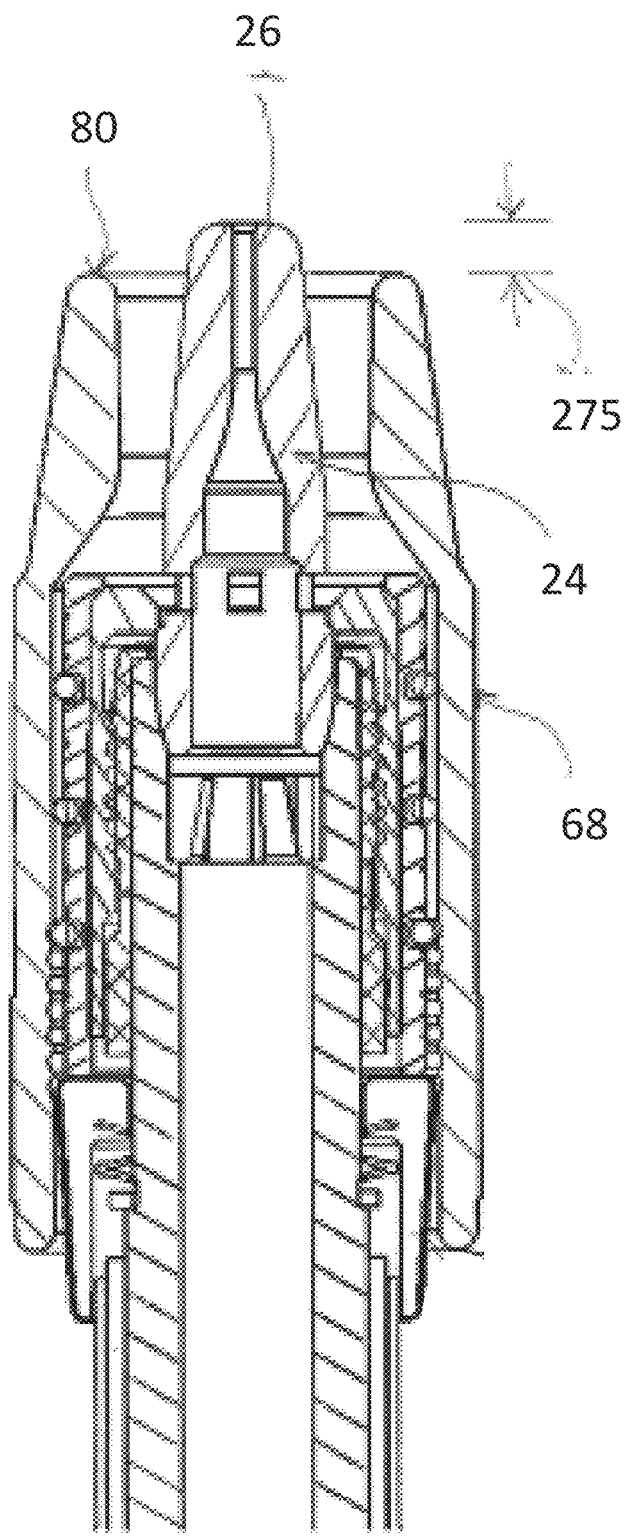
FIG. 18D is a partial cross-sectional view of the nozzle body of FIG. 17 in a third position.

Referring to FIGS. 17 and 18A to 18D, another form of the indicia 260 is on the collar body 65 for allowing a nozzle distance 275 to be set by aligning the proximal opening 78 of the nozzle body 68 with the desired nozzle distance 275. In one form there is an initial position and three additional positions for setting the nozzle distance 275. As shown in FIG. 18A, an initial exemplary position where the distal end face 26 of the contact tip 24 is recessed within the nozzle body 68 to the nozzle distance 275 of approximately ¼ inches. Referring to FIG. 18B, an example of a first position is shown with the distal end face 26 of the contact tip is recessed within the nozzle body 68 to the nozzle distance 275 of approximately ⅛ inches. As shown in FIG. 18C, an example of a second position is shown and in this form, the distal end face 26 of the contact tip 24 is flush with the distal opening 80 of the nozzle body 174. Referring to FIG. 18D, another example of a third position is shown with the distal end face 26 of the contact tip 24 protruding beyond the distal opening a nozzle distance of approximately ⅛ inches. Therefore, the indicia 260 on the collar body 65 is used to allow the user to quickly adjust the nozzle position without having to perform any manual measurements between the distal opening 80 of the nozzle body 68 and the distal end face 26 of the contact tip 24. It should be understood that the specific dimensions of ¼ and ⅛ inches are merely exemplary and should not be construed as limiting the scope of the present disclosure.

Figure 19:
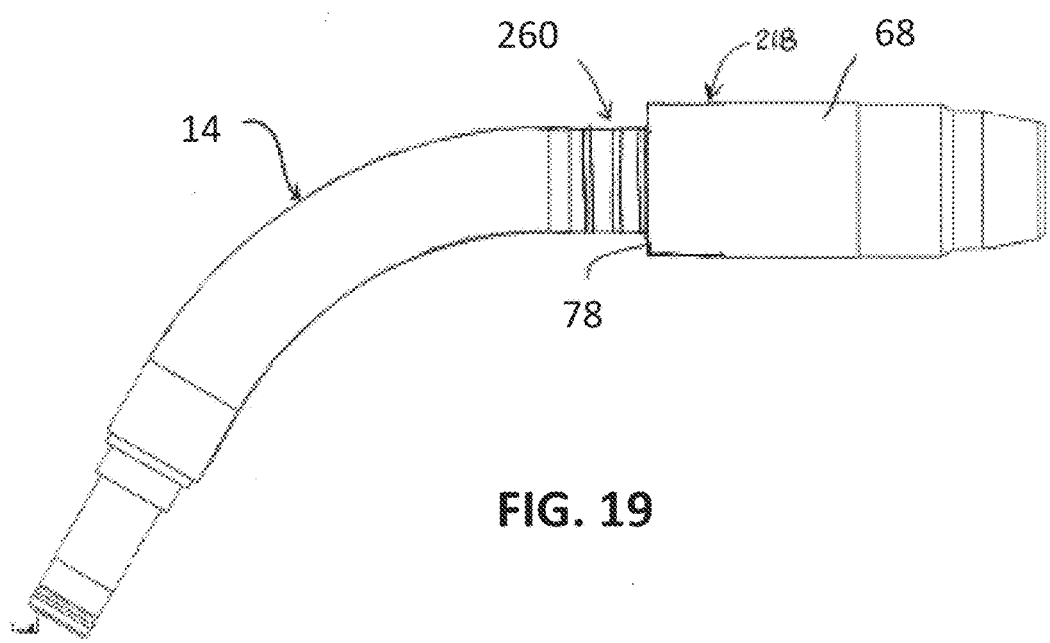
FIG. 19 is a side view of another form of a conductor tube assembly having position indicia, a nozzle body constructed in accordance with the teachings of the present disclosure.

Alternatively, as illustrated in FIG. 19, the position indicia 260 may be on the conductor tube 14, and the nozzle body 68 includes a proximal extension 218 that extends beyond the collar assembly (not shown). The proximal extension 218 of the nozzle body 68 allows the user to align a proximal edge 78 of the nozzle body with the indicia 260 on the conductor tube 14 for adjusting the nozzle body 68 into the desired positional relationship with the contact tip.

The position indicia 260 can be various scales to allow for quick adjustment to the location of the nozzle body 68 for various applications and a nozzle distance between distal opening 80 of the nozzle body 68 and the distal end face 26 of the contact tip 24.

The consumable components are typically, rated to a duty cycle. The duty cycle is usually determined by the duration of the weld operation and the amperage used during continuous operation of the welding gun. For example, a light duty application may be considered to be those welding operations that are rated and use approximately 250 amperes and below. A medium duty application may be considered to be welding operations with a range from approximately 250 amperes to approximately 350 amperes, and a heavy duty application is generally 350 amperes and above.

Referring to FIG. 20, in one form, a nozzle assembly 200 for a light duty application. The nozzle assembly 200 comprises a nozzle body 202 and an insulator 204. The insulator 204 may be over molded onto the nozzle body 202. As further shown, the insulator 204 defines an internal bore 206 having a plurality of detents 208 at a proximal end portion 207. The detents 208 are a series of grooves that are spaced along the internal bore 206 to progressively engage sealing members 216. The user can adjust the relative position of the nozzle with the distal end of the contact tip 24 depending on the engagement between the detents 208 and the sealing members 216.

The insulator, whether a plastic material or other insulator, has a high strength, hardness and rigidity to provide for durability of the nozzle body 202 and the detents 208. For example, the over molded insulator 204 may be made from a thermoset polyester, such as BMC 6605. However, it is appreciated that the insulator 204 may be any insulating material that can withstand the amperage for the duty cycle of the welding application.

Referring to FIG. 21, another form of a nozzle assembly 300 for a light duty application is shown. The nozzle assembly 300 comprises a nozzle body 302, an insulator 304, and a nozzle sleeve 306. In this form, the nozzle assembly 300 is assembled together by a crimping process to secure the insulator 304 and the nozzle sleeve 309 within the nozzle body 302. The nozzle sleeve 309 defines an internal bore 306 of the nozzle body 302. The internal bore 306 further defines a plurality of detents 308 at a proximal end portion 307. The nozzle sleeve 309 may be a made of various materials including metals such as a copper alloy, brass alloy, or alternately plastic materials. Other materials may be used as long as the material and withstand the heat of the application and the amperage needed for the specific welding application. For example, in a light duty application is generally between 250 to 350 Amperes.

An insert assembly 210, in one form, is the same for both forms of the nozzle body 200, 300 of the light duty applications. The insert assembly 210 has a proximal exterior surface 212 with a plurality of groove 214, and a plurality of spring bands 216. The spring bands in this form are split ring metal seals that provide an outward bias and engage into the detents to provide a user with a haptic feedback on the position of the nozzle assembly. The spring bands also provide a bias force to secure the nozzle assembly 200, 300 to the insert assembly 210. The insert assembly 210 is threaded onto the conductor tube (not shown) and secures the contact tip 24 to the conductor tube (not shown). The insert assembly 210 for the light duty applications has two grooves 214 each for retaining a spring band 216. The nozzle bodies 200, 300 define three detents 216 that secure the nozzle body 200, 300 in three positions relative to a distal opening of the nozzle body and the contact tip. The nozzle body slides and locks the detents into positions relative to the contact tip for adjusting the flow characteristics of the shield gas to accommodate a wide variety of welding parameters and user preferences.

Referring now to FIGS. 22 and 23, another form of the nozzle assembly for medium and heavy duty applications is described. The nozzle assembly may be scaled and sized to accommodate a variety of diameters of welding wire and consumables components. It is also appreciated that the materials may vary depending on the duty cycle and the amperage rating. In this form, the nozzle assembly 400 includes a nozzle body 402. The nozzle body 402 may be a singular metal component, typically a copper alloy, but may be formed of various other metals and alloys, among other temperature and durability capable materials, while remaining within the scope of the present disclosure. The nozzle body 402 has an internal bore 406 with a plurality of detents 408 within a portion 407 of the internal bore 406.

The medium and heavy duty applications may also include in an alternate form an insert assembly 410 that includes a nozzle insert 418, insulator 420 and a slip adapter 420, which are secured together in one form by a crimping process. However, it should be understood that various processes may be used to secure the components of the insert assembly 410 while remaining within the scope of the present disclosure. The slip adapter 422 defines a proximal exterior surface 412 with a plurality of grooves 414, and a plurality of spring bands 416. The spring bands 416 in this form include a split spring ring, as in the previous forms and a spring metal band 424. The grooves 414 may vary in width to accommodate the spring band 416. And the spring bands 416 may be customized, such as by way of example, a metal band 424 that defines circumferentially spaced protrusions 426. The metal band provide the biased outward force and the protrusions 426 are designed to engage within the plurality of detents 408 of the internal bore 406 of the nozzle body 402. During adjusting of the nozzle body 402 the protrusions 426 provide tactile feedback and assist the user with locating the nozzle body 402 at the desired location relative to the distal end of the contact tip (not shown).

In FIG. 24, various forms of consumable assemblies having a nozzle body 802, 802', 802" and a contact tip 846, 846', 846" are shown. Both the nozzle body 802, 802', 802" and the contact tip 846, 846', 846" define exterior surfaces having matching indicia 800, 800', 800" to assist with identifying the correct pairing of the nozzle body 802, 802', 802" with the contact tip 846, 846', 846". The matching indicia 800 may correspond to a duty rating for pairing the nozzle body 802 with the contact tip 846.

For example, the matching indicia 800 may be a series of grooves on the exterior surfaces 804, as shown. Generally, the number of grooves increases as the duty rating increases or may be selected for pairing the contact tip and nozzle body for a specific application. For example, one (1) set groove on each of the nozzle body and contact tip indicates a light duty application. Two (2) sets of grooves indicates a medium duty application, and three (3) sets of grooves indicates a heavy duty application. In one form, the number of grooves is four (4) to indicate the nozzle body 802" and contact tip 846" for a specific duty cycle and tapered application. It is further contemplated that the exterior surface of the nozzle may alternately define various indicia that are easily matched with corresponding indicia on the contact tip, rather than the matching bands as illustrated herein. In another form, the nozzle body 802 may include a series of knurl bands that are matched with a series of grooves on the exterior surface of the contact tip. The grooves may further be defined as any raised or recessed surface texture, knurling or raised bands that provide visual indication or indicia to the exterior surface of the consumable component. Accordingly, the use of grooves is merely exemplary and should not be construed as limiting the scope of the present disclosure.

According to another aspect of the present disclosure, a method of adjusting the positioning of a distal opening of a nozzle body with a distal end face of a contact tip in an arc welding apparatus is provided. Referring to FIG. 25, the method 1000 generally provides 1005 an arc welding apparatus constructed according to the present disclosure that has a handle, a conductor tube attached to the handle; and a consumable assembly attached to the conductor tube; the consumable assembly including a contact tip and a nozzle assembly. The nozzle assembly comprises an insulator with a plurality of grooves around an outer periphery, a plurality of sealing members disposed within the grooves of the insulator; and a nozzle body slip-fit around the insulator, such that the insulator defines position indicia. The nozzle body is aligned 1010 with the position indicia in order to adjust the positioning of the distal opening of the nozzle body with the distal end face of the contact tip. The alignment of the nozzle body with the position indicia involves locating the position indicia so that it can be viewed through at least one window or aperture in the nozzle body.

The various forms of the present disclosure provide a simplified structure, more uniform heat distribution and improved cooling to increase consumable life, among other benefits. The various forms of the present disclosure further provide additional adjustments to a nozzle assembly, thereby allowing a consumable assembly to be adaptable for a wider variety of applications.

What is claimed is:

1. A nozzle assembly comprising:
   an insulator surrounding a nozzle insert, the insulator having a plurality of grooves around an outer periphery;
   a plurality of sealing members disposed within the grooves of the insulator; and
   a nozzle body slip-fit around the insulator:
   wherein at least one of the insulator and the nozzle body define a visual position indicia configured to visually indicate to a user of the nozzle assembly a relative positioning of the nozzle body with respect to the insulator based upon an intended application.

2. The nozzle assembly according to claim 1, wherein the insulator has a scale along its outer periphery as the position indicia.

3. The nozzle assembly according to claim 2, wherein the insulator defines a plurality of position rings disposed along its outer periphery as the scale.

4. The nozzle assembly according to claim 2, wherein the nozzle body defines at least one window or aperture through which the scale can be viewed as the position indicia.

5. The nozzle assembly according to claim 3, wherein the plurality of position rings comprises a first ring, a second ring, and a third ring, the first ring being different from the second and third rings, and the second ring being different from the third ring.

6. The nozzle assembly of claim 5, wherein the nozzle insert includes a proximal end, a distal end, a central bore extending from the proximal end toward the distal end, and an internal gas diverter that defines a seating surface toward the proximal end of the nozzle insert.

7. The nozzle assembly of claim 6, wherein the internal gas diverter defines a profiled diverter orifice that extends distally from the central bore.

8. The nozzle assembly of claim 7, further comprising:
   a contact tip coupled to a conductor tube, the contact tip being coaxially disposed within the nozzle assembly when the nozzle assembly is coupled to the conductor tube.

9. The nozzle assembly of claim 8, wherein the contact tip includes a body that defines an internal cavity extending from a proximal end coupled to the conductor tube to a distal end, and a plurality of apertures radially disposed around the body and in fluid communication with the internal cavity.

10. The nozzle assembly of claim 9, wherein, when the nozzle assembly is coupled to the conductor tube, the contact tip engages the seating surface of the nozzle insert and the profiled diverter orifice extends around the plurality of apertures of the contact tip.

11. The nozzle assembly of claim 10, wherein the position indicia further allows a user of the nozzle assembly to position a distal opening of the nozzle body relative to the distal end of the contact tip.

12. The nozzle assembly of claim 11, wherein aligning the nozzle body with the first ring positions the distal opening of the of the nozzle body a first nozzle distance from the distal end of the contact tip disposed within the nozzle body.

13. The nozzle assembly of claim 12, wherein aligning the nozzle body with the second ring positions the distal opening of the of the nozzle body a second nozzle distance from the distal end of the contact tip disposed within the nozzle body, the second nozzle distance being smaller than the first nozzle distance.

14. The nozzle assembly of claim 13, wherein aligning the nozzle body with the third ring positions the distal opening of the of the nozzle body a third nozzle distance from the distal end of the contact tip, where the distal end of the contact tip protrudes from the distal opening of the nozzle body.

15. The nozzle assembly of claim 14, wherein the nozzle body further comprises:
   a nose portion that narrows inwardly and is disposed proximate the distal opening of the nozzle assembly.

16. The nozzle assembly according to claim 1, wherein the nozzle assembly is attached to a conductor tube that includes position indicia.

17. The nozzle assembly according to claim 16, wherein the nozzle body includes a proximal end extension that allows alignment of the nozzle body with the position indicia on the conductor tube in order to adjust the nozzle body so that it is in a desired positional relationship with a contact tip.

18. The nozzle assembly of claim 1, wherein the nozzle body further comprises a distal end face and an exterior surface defining an index marking for measuring a trim distance for a welding liner; wherein the distal end face abuts a portion of a conductor tube, and the welding liner extends distally from the portion of the conductor tube, for the measuring of the welding liner to extend into a contact tip.

19. The nozzle assembly of claim 18, wherein a length between a distal end face of the conductor tube and the index marking of the nozzle body defines the trim distance.

20. The nozzle assembly of claim 19, wherein the nozzle body defines a tapered end portion.

21. The nozzle assembly of claim 20, wherein the nozzle body defines the trim distance measured along the tapered end portion.

22. The nozzle assembly of claim 20, wherein the nozzle body defines the trim distance is measured perpendicular to the distal end face.

* * * * *